(12) United States Patent
Katsuta

(10) Patent No.: US 11,837,014 B2
(45) Date of Patent: *Dec. 5, 2023

(54) DETECTION DEVICE

(71) Applicant: Japan Display Inc., Tokyo (JP)

(72) Inventor: Tadayoshi Katsuta, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/725,766

(22) Filed: Apr. 21, 2022

(65) Prior Publication Data

US 2022/0262158 A1 Aug. 18, 2022

Related U.S. Application Data

(63) Continuation of application No. PCT/JP2020/041267, filed on Nov. 4, 2020.

(30) Foreign Application Priority Data

Nov. 5, 2019 (JP) ................................. 2019-201045

(51) Int. Cl.
*G06V 40/13* (2022.01)
(52) U.S. Cl.
CPC ...... *G06V 40/1318* (2022.01); *G06V 40/1329* (2022.01)
(58) Field of Classification Search
None
See application file for complete search history.

(56) References Cited

U.S. PATENT DOCUMENTS

2010/0328478 A1 12/2010 Tanaka et al.
2016/0316159 A1* 10/2016 Yoneda ............... H01L 27/1255
(Continued)

FOREIGN PATENT DOCUMENTS

| JP | 2011-010054 A | 1/2011 |
| JP | 2016-208515 A | 12/2016 |
| JP | 2018-117291 A | 7/2018 |

OTHER PUBLICATIONS

International Search Report issued in International Patent Application No. PCT/JP2020/041267 dated Dec. 15, 2020 and English translation of same. 5 pages.

(Continued)

*Primary Examiner* — Joseph R Haley
(74) *Attorney, Agent, or Firm* — K&L Gates L.L.P

(57) ABSTRACT

A detection device includes: a sensor in which detection elements each including a photoelectric conversion element are arranged in a detection region; a drive circuit configured to supply drive signals to the detection elements; and a detection circuit configured to process a detection signal output from each detection element. Each detection element includes: a source follower transistor configured to output a signal corresponding to an electric charge generated in the photoelectric conversion element; and a read transistor configured to read an output signal of the source follower transistor and output the detection signal. A potential obtained by superimposing a threshold voltage of the source follower transistor and a voltage drop caused by on-resistance of the read transistor on a reset potential serving as a reference value for a voltage variation amount of the detection signal is set as an initial value of a potential applied to the photoelectric conversion element.

6 Claims, 20 Drawing Sheets

(56) References Cited

U.S. PATENT DOCUMENTS

2018/0204971 A1    7/2018  Yamamoto
2022/0271074 A1*   8/2022  Katsuta .............. G06V 40/1318

OTHER PUBLICATIONS

Written Opinion issued in International Patent Application No. PCT/JP2020/041267 dated Dec. 15, 2020. 3 pages.

* cited by examiner

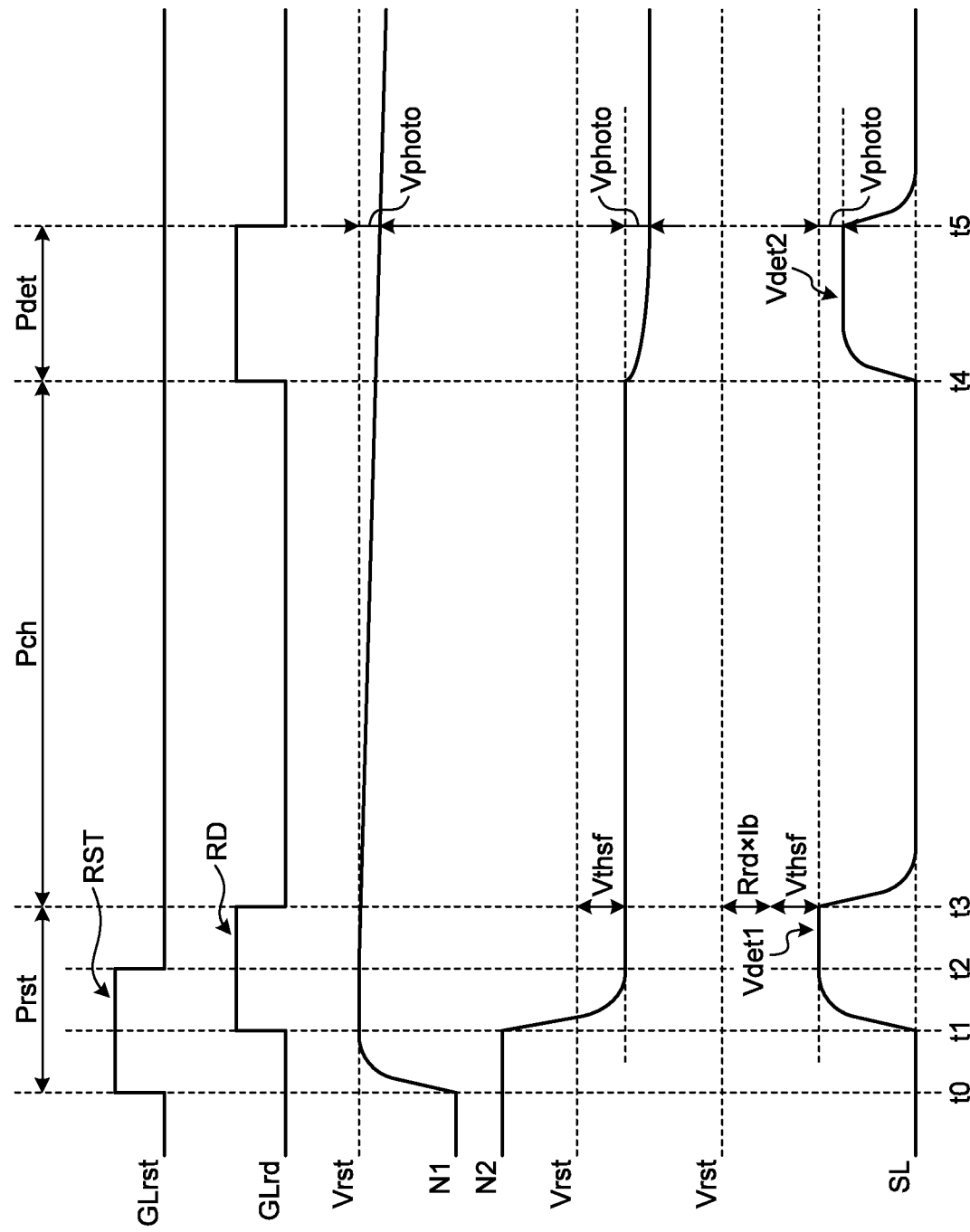

US 11,837,014 B2

DETECTION DEVICE

CROSS-REFERENCE TO RELATED APPLICATION

This application claims the benefit of priority from Japanese Patent Application No. 2019-201045 filed on Nov. 5, 2019 and International Patent Application No. PCT/JP2020/041267 filed on Nov. 4, 2020, the entire contents of which are incorporated herein by reference.

BACKGROUND

1. Technical Field

What is disclosed herein relates to a detection device.

2. Description of the Related Art

Japanese Patent Application Laid-open Publication No. 2011-010054 (JP-A-2011-010054) discloses a photoelectric conversion device that uses a positive-intrinsic-negative (PIN) photodiode as a photoelectric conversion element for detection. Such a photoelectric conversion device transfers an electric charge based on input information photoelectrically converted by a photoelectric converter to an external capacitor, and the external capacitor converts the electric charge into a signal voltage.

In JP-A-2011-010054, each pixel is provided with a source follower circuit that includes a field-effect transistor for receiving, at the gate thereof, a signal charge generated by the photoelectric converter, and that causes the field-effect transistor to read out the signal voltage corresponding to the signal charge to a signal line. While this configuration enables high-speed signal reading, there is a problem that variations in offset potential of the field-effect transistor appear as fixed pattern noise. Therefore, JP-A-2011-010054 describes to correct the variations in the offset value corresponding to a threshold voltage of the source follower circuit.

In JP-A-2011-010054 described above, a row selection transistor is provided between the source of a reading transistor of the source follower circuit and a vertical signal line. However, the effect of variations in on-resistance of the row selection transistor on a detection value is not taken into account. Therefore, the detection value may have variations.

For the foregoing reasons, there is a need for a detection device capable of reducing the variations in the detection value.

SUMMARY

According to an aspect, a detection device includes: a sensor in which a plurality of detection elements each including a photoelectric conversion element are arranged in a detection region; a drive circuit configured to supply a plurality of drive signals to the detection elements; and a detection circuit configured to process a detection signal output from each of the detection elements. Each of the detection elements includes: a source follower transistor configured to output a signal corresponding to an electric charge generated in the photoelectric conversion element; and a read transistor configured to read an output signal of the source follower transistor and output the detection signal. A potential obtained by superimposing a threshold voltage of the source follower transistor and a voltage drop caused by on-resistance of the read transistor on a reset potential serving as a reference value for a voltage variation amount of the detection signal is set as an initial value of a potential applied to the photoelectric conversion element.

BRIEF DESCRIPTION OF THE DRAWINGS

FIG. 9 is a timing waveform diagram illustrating an operation example of the detection element according to the comparative example;

DETAILED DESCRIPTION

Figure 1A:
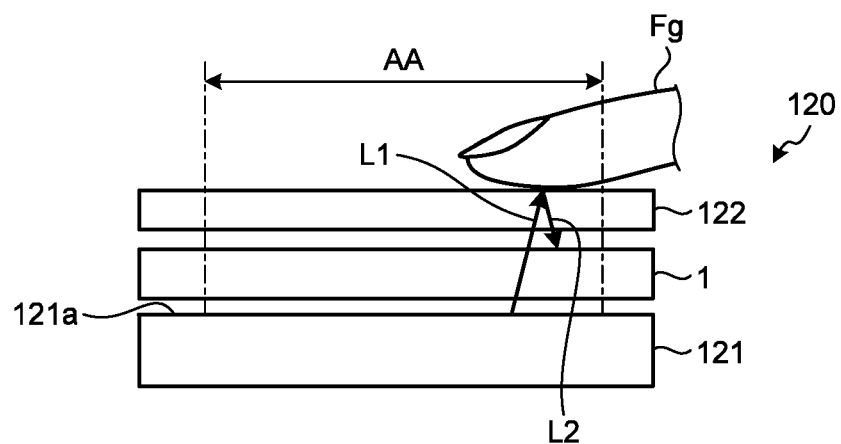
FIG. 1A is a sectional view illustrating a schematic sectional configuration of a detection apparatus having an illumination device, the detection apparatus including a detection device according to an embodiment.

The following describes a mode (embodiment) for carrying out the present disclosure in detail with reference to the drawings. The present disclosure is not limited to the description of the embodiment given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the description and the drawings, and detailed description thereof may not be repeated where appropriate.

In the present specification and claims, in expressing an aspect of disposing another structure on or above a certain structure, a case of simply expressing "on" includes both a case of disposing the other structure immediately on the certain structure so as to contact the certain structure and a case of disposing the other structure above the certain structure with still another structure interposed therebetween, unless otherwise specified.

Embodiment

FIG. 1A is a sectional view illustrating a schematic sectional configuration of a detection apparatus having an illumination device, the detection apparatus including a detection device according to the embodiment. As illustrated in FIG. 1A, a detection apparatus 120 having an illumination device includes a detection device 1, an illumination device 121, and a cover glass 122. The illumination device 121, the detection device 1, and the cover glass 122 are stacked in this order in a direction orthogonal to a surface of the detection device 1.

The illumination device 121 has a light-emitting surface 121a for emitting light, and emits light L1 from the light-emitting surface 121a toward the detection device 1. The illumination device 121 is a backlight. The illumination device 121 may be, for example, what is called a side light-type backlight that includes a light guide plate provided in a position corresponding to a detection region AA and a plurality of light sources arranged at one end or both ends of the light guide plate. For example, light-emitting diodes (LEDs) for emitting light in a predetermined color are used as the light sources. The illumination device 121 may be what is called a direct-type backlight that includes the light sources (such as the LEDs) provided directly below the detection region AA. The illumination device 121 is not limited to the backlight, and may be provided on a lateral side or an upper side of the detection device 1 and may emit the light L1 from the lateral side or the upper side of a finger Fg.

The detection device 1 is provided so as to face the light-emitting surface 121a of the illumination device 121. The light L1 emitted from the illumination device 121 passes through the detection device 1 and the cover glass 122. The detection device 1 can detect a detection target (for example, asperities (such as a fingerprint) on a surface of the finger Fg in the example illustrated in FIG. 1A) by detecting light L2 reflected on an interface between the cover glass 122 and air. The color of the light L1 from the illumination device 121 may be varied depending on the detection target.

The cover glass 122 is a member for protecting the detection device 1 and the illumination device 121, and covers the detection device 1 and the illumination device 121. The cover glass 122 is, for example, a glass substrate. The cover glass 122 is not limited to a glass substrate, and may be, for example, a resin substrate. The cover glass 122 may or may not be provided. In this case, the surface of the detection device 1 is provided with a protective layer, and the detection target (in this example, the finger Fg) contacts the protective layer of the detection device 1.

The detection apparatus 120 having an illumination device may be provided with a display panel instead of the illumination device 121. The display panel may be, for example, an organic electroluminescent (EL) diode (organic light-emitting diode (OLED)) panel or an inorganic EL display (micro-LED or mini-LED). Alternatively, the display panel may be a liquid crystal display (LCD) panel using liquid crystal elements as display elements or an electrophoretic display (EPD) panel using electrophoretic elements as the display elements.

Figure 1B:
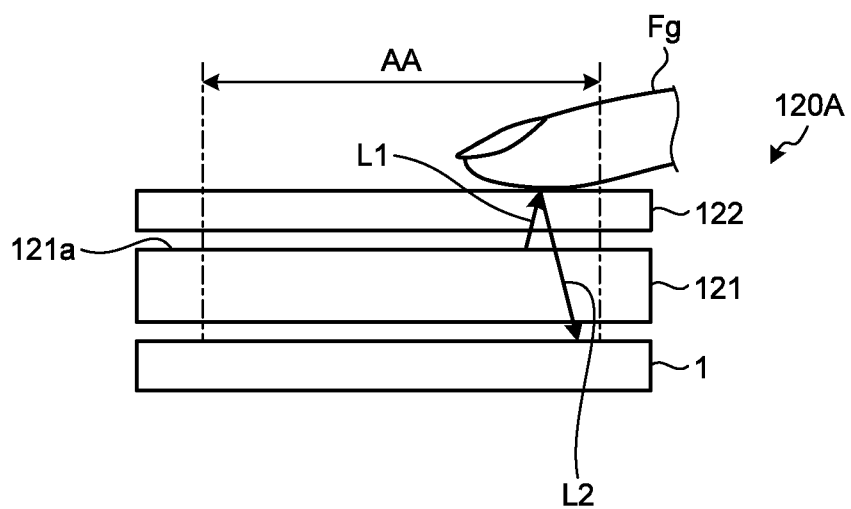
FIG. 1B is a sectional view illustrating a schematic sectional configuration of a detection apparatus having an illumination device according to a modification of the embodiment.

FIG. 1B is a sectional view illustrating a schematic sectional configuration of a detection apparatus having an illumination device according to a modification of the embodiment. As illustrated in FIG. 1B, the detection device 1, the illumination device 121, the cover glass 122 in the detection apparatus 120A having an illumination device are stacked in this order in the direction orthogonal to the surface of the detection device 1. Also, in the present modification, a display panel such as an organic EL display panel can be employed as the illumination device 121.

The light L1 emitted from the illumination device 121 passes through the cover glass 122, and then, is reflected by the finger Fg. The light L2 reflected by the finger Fg passes through the cover glass 122, and further passes through the illumination device 121. The detection device 1 can perform detection of information on a living body, such as the detection of the fingerprint, by receiving the light L2 that has passed through the illumination device 121.

Figure 2:
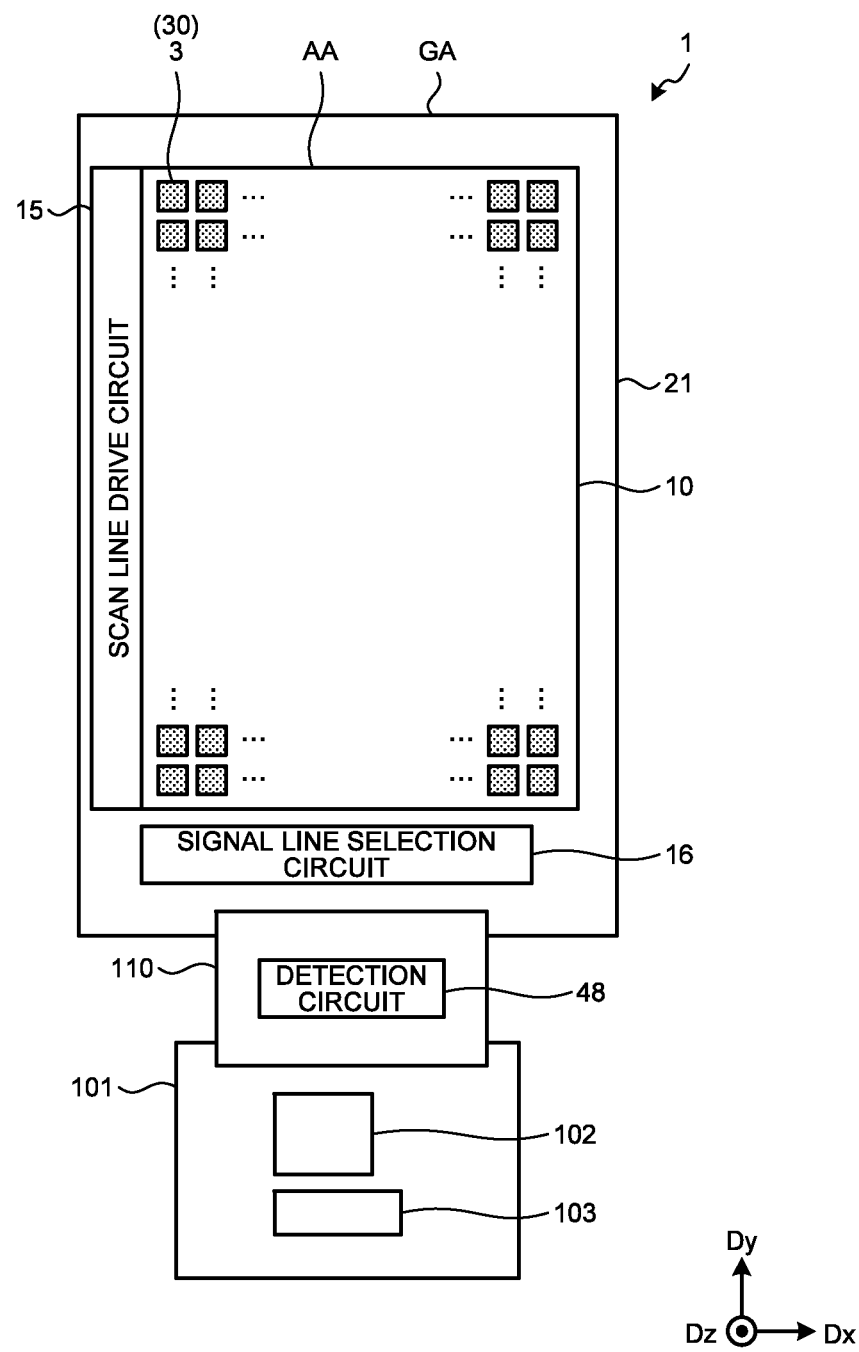
FIG. 2 is a plan view illustrating the detection device according to the embodiment.

FIG. 2 is a plan view illustrating the detection device according to the embodiment. As illustrated in FIG. 2, the detection device 1 includes a substrate 21, a sensor 10, a scan line drive circuit 15, a signal line selection circuit 16, a detection circuit 48, a control circuit 102, and a power supply circuit 103.

The substrate 21 is electrically coupled to a control substrate 101 through a wiring substrate 110. The wiring substrate 110 is, for example, a flexible printed circuit board or a rigid circuit board. The wiring substrate 110 is provided with the detection circuit 48. The control substrate 101 is provided with the control circuit 102 and the power supply circuit 103. The control circuit 102 is, for example, a field-programmable gate array (FPGA). The control circuit 102 supplies control signals to the sensor 10, the scan line drive circuit 15, and the signal line selection circuit 16 to control detection operation of the sensor 10. The power supply circuit 103 supplies voltage signals including, for example, a power supply potential Vsf, a reset potential Vrst, and a reference potential VCOM (refer to FIG. 4) to the sensor 10, the scan line drive circuit 15, and the signal line selection circuit 16.

The substrate 21 has the detection region AA and a peripheral region GA. The detection region AA is a region overlapping a plurality of detection elements 3 included in the sensor 10. The peripheral region GA is a region outside the detection region AA, and is a region not overlapping the detection elements 3. That is, the peripheral region GA is a region between the outer perimeter of the detection region AA and the edges of the substrate 21. The scan line drive circuit 15 and the signal line selection circuit 16 are provided in the peripheral region GA.

Each of the detection elements 3 of the sensor 10 is a photosensor including a photoelectric conversion element 30. The photoelectric conversion element 30 is a photodiode and outputs an electrical signal corresponding to light applied to each of the photoelectric conversion elements 30. More specifically, the photoelectric conversion element 30 is a positive-intrinsic-negative (PIN) photodiode. The detection elements 3 are arranged in a matrix having a row-column configuration in the detection region AA. The photoelectric conversion element 30 included in each of the detection elements 3 performs the detection in accordance with a gate drive signal (for example, a reset control signal RST or a read control signal RD) supplied from the scan line drive circuit 15. Each of the photoelectric conversion elements 30 outputs the electrical signal corresponding to the light applied to the photoelectric conversion element 30 as a detection signal Vdet to the signal line selection circuit 16. The detection device 1 detects the information on the living body based on the detection signals Vdet received from the photoelectric conversion elements 30.

The scan line drive circuit 15 and the signal line selection circuit 16 are provided in the peripheral region GA. Specifically, the scan line drive circuit 15 is provided in a region extending along a second direction Dy in the peripheral region GA. The signal line selection circuit 16 is provided in a region extending along a first direction Dx in the peripheral region GA, and is provided between the sensor 10 and the detection circuit 48.

The first direction Dx is one direction in a plane parallel to the substrate 21. The second direction Dy is another direction in the plane parallel to the substrate 21, and is a direction orthogonal to the first direction Dx. The second direction Dy may non-orthogonally intersect the first direction Dx. A third direction Dz is a direction orthogonal to the first direction Dx and the second direction Dy, and is a direction normal to the substrate 21.

Figure 3:
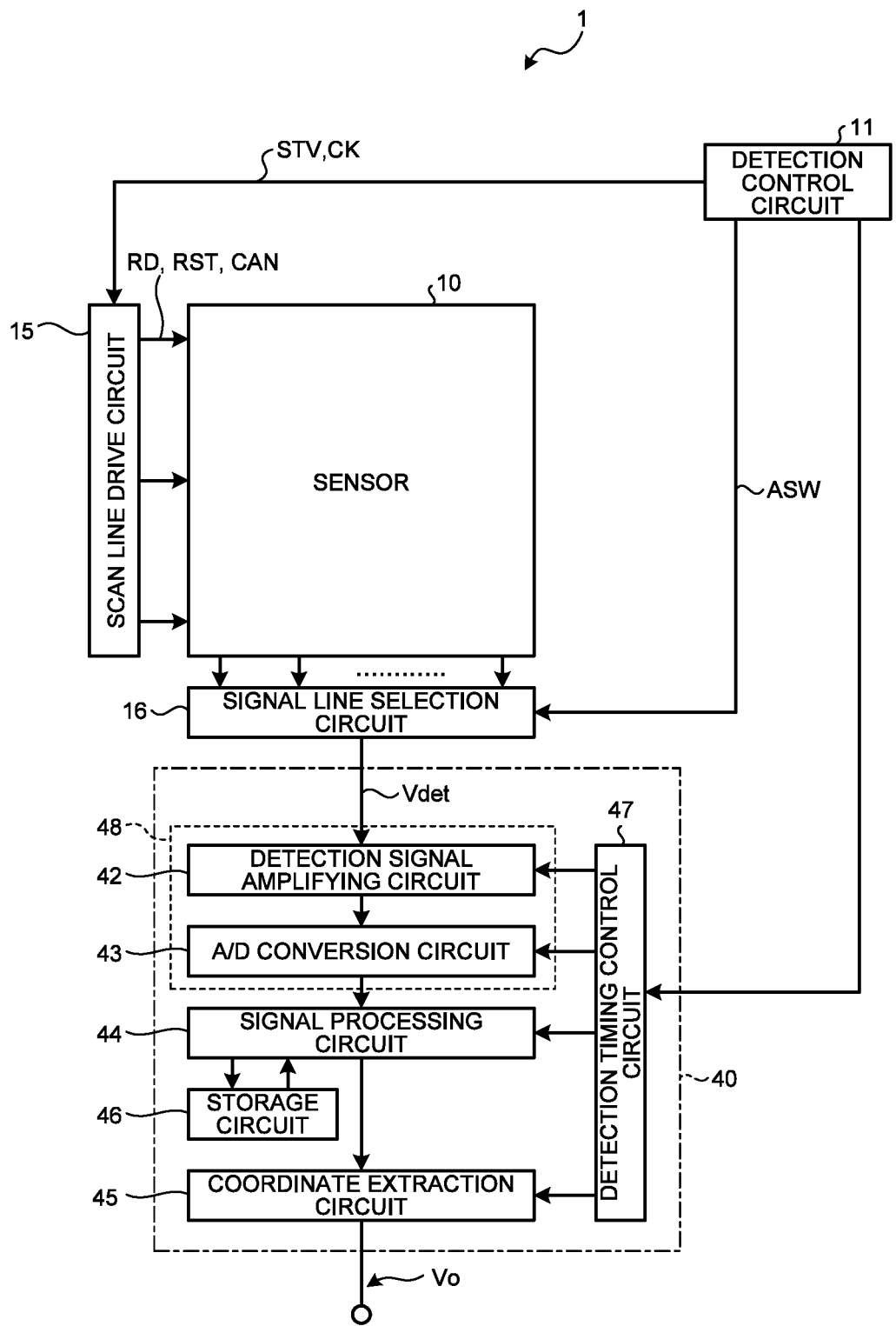
FIG. 3 is a block diagram illustrating a configuration example of the detection device according to the embodiment.

FIG. 3 is a block diagram illustrating a configuration example of the detection device according to the embodiment. As illustrated in FIG. 3, the detection device 1 further includes a detection control circuit 11 and a detector (detection signal processing circuit) 40. One, some, or all functions of the detection control circuit 11 may be included in the control circuit 102. One, some, or all functions of the detector 40 other than those of the detection circuit 48 may also be included in the control circuit 102.

The detection control circuit 11 is a circuit that supplies respective control signals to the scan line drive circuit 15, the signal line selection circuit 16, and the detector 40 to control operations thereof. The detection control circuit 11 supplies various control signals including, for example, a start signal STV and a clock signal CK to the scan line drive circuit 15. The detection control circuit 11 also supplies various control signals including, for example, a selection signal ASW to the signal line selection circuit 16.

The scan line drive circuit 15 is a circuit that drives a plurality of gate lines (a read control scan line GLrd, a reset control scan line GLrst, and a cancel control scan line GLcan (refer to FIG. 4)) based on the various control signals. The scan line drive circuit 15 sequentially or simultaneously selects the gate lines, and supplies the gate drive signals (for example, the reset control signal RST, the read control signal RD, and a cancel control signal CAN) to the selected gate lines. Through this operation, the scan line drive circuit 15 selects the photoelectric conversion elements 30 coupled to the gate lines.

Figure 4:
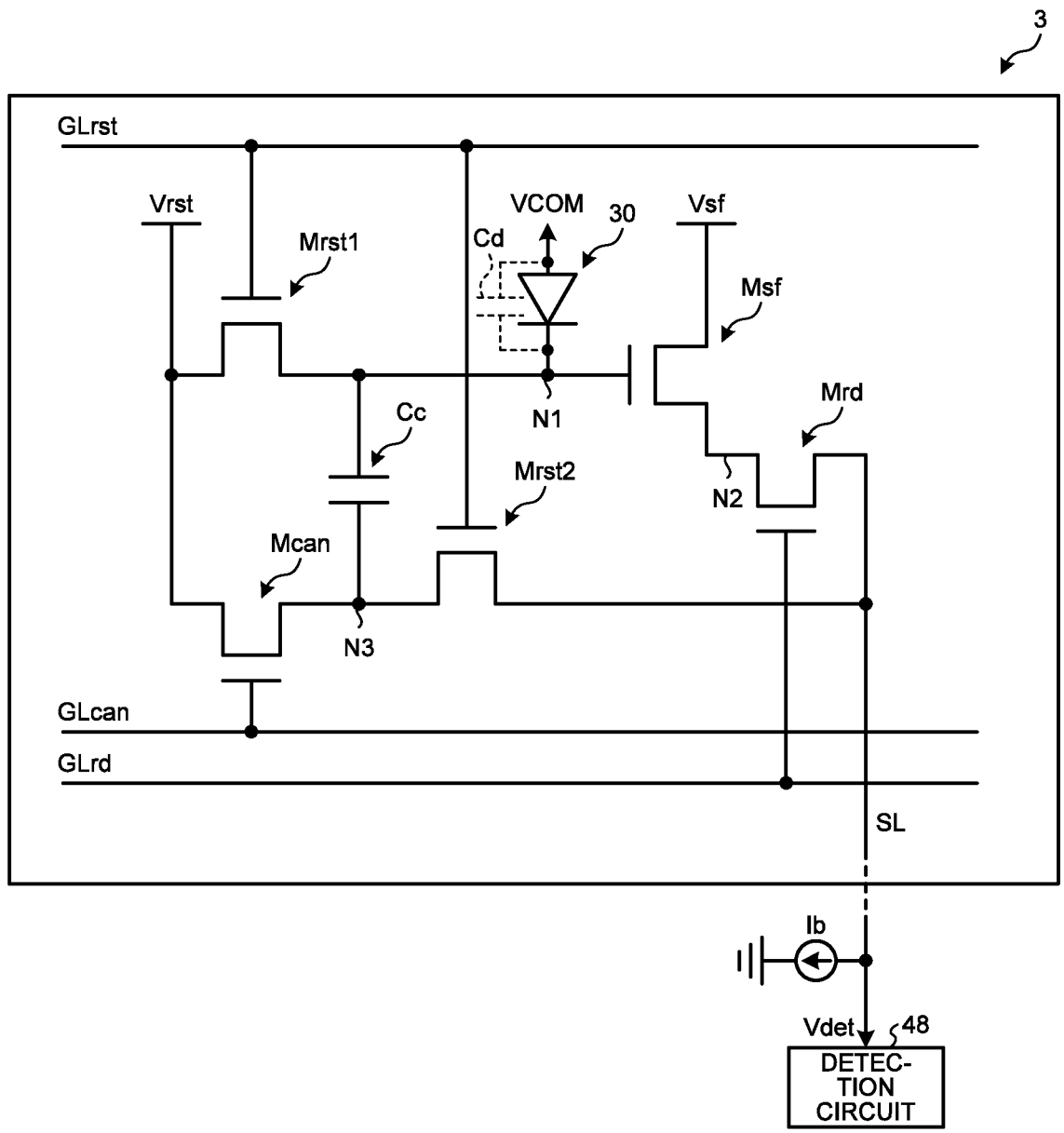
FIG. 4 is a circuit diagram illustrating a detection element according to the embodiment.

The signal line selection circuit 16 is a switching circuit that sequentially or simultaneously selects a plurality of output signal lines SL (refer to FIG. 4). The signal line selection circuit 16 is, for example, a multiplexer. The signal line selection circuit 16 couples the selected output signal lines SL to the detection circuit 48 based on the selection signal ASW supplied from the detection control circuit 11. By this operation, the signal line selection circuit 16 outputs the detection signal Vdet of the photoelectric conversion element 30 to the detector 40. The signal line selection circuit 16 may be omitted. In this case, the output signal lines SL may be directly coupled to the detection circuit 48.

The detector 40 includes the detection circuit 48, a signal processing circuit 44, a coordinate extraction circuit 45, a storage circuit 46, and a detection timing control circuit 47. The detection timing control circuit 47 performs control to cause the detection circuit 48, the signal processing circuit 44, and the coordinate extraction circuit 45 to operate in synchronization with one another based on a control signal supplied from the detection control circuit 11.

The detection circuit 48 is, for example, an analog front-end (AFE) circuit. The detection circuit 48 is a signal processing circuit having functions of at least a detection signal amplifying circuit 42 and an analog-to-digital (A/D) conversion circuit 43. The detection signal amplifying circuit 42 amplifies the detection signal Vdet. The A/D conversion circuit 43 converts an analog signal output from the detection signal amplifying circuit 42 into a digital signal.

The signal processing circuit 44 is a logic circuit that detects a predetermined physical quantity received by the sensor 10 based on output signals of the detection circuit 48. The signal processing circuit 44 can detect asperities on the surface of the finger Fg or a palm based on the signals from the detection circuit 48 when the finger Fg is in contact with or in proximity to a detection surface. The signal processing circuit 44 may detect the information on the living body based on the signals from the detection circuit 48. Examples of the information on the living body include a blood vessel image, a pulse wave, pulsation, and a blood oxygen saturation level of the finger Fg or the palm.

The storage circuit 46 temporarily stores therein signals calculated by the signal processing circuit 44. The storage circuit 46 may be, for example, a random-access memory (RAM) or a register circuit.

The coordinate extraction circuit 45 is a logic circuit that obtains detected coordinates of the asperities on the surface of the finger Fg or the like when the contact or proximity of the finger Fg is detected by the signal processing circuit 44. The coordinate extraction circuit 45 is the logic circuit that also obtains detected coordinates of blood vessels of the finger Fg or the palm. The coordinate extraction circuit 45 combines the detection signals Vdet output from the respective detection elements 3 of the sensor 10 to generate two-dimensional information representing a shape of the asperities on the surface of the finger Fg or the like. The coordinate extraction circuit 45 may output the detection signals Vdet as sensor outputs Vo instead of calculating the detected coordinates.

The following describes a circuit configuration example and an operation example of the detection device 1. FIG. 4 is a circuit diagram illustrating each of the detection elements according to the embodiment. As illustrated in FIG. 4, each of the detection elements 3 includes the photoelectric conversion element 30, a capacitive element Cc, a first reset transistor Mrst1, a second reset transistor Mrst2, a cancel transistor Mcan, a read transistor Mrd, and a source follower transistor Msf. The detection element 3 is provided with the reset control scan line GLrst, the read control scan line GLrd, and the cancel control scan line GLcan as detection drive lines, and provided with a corresponding one of the output signal lines SL as wiring for signal reading.

The output signal line SL is coupled to a constant current source for applying a bias current Ib to the read transistor Mrd. This configuration allows the detection element 3 to detect the detection signal Vdet applied to the output signal line SL. This constant current source may be provided in the detection circuit 48 or in the substrate 21.

Although FIG. 4 illustrates one of the detection elements 3, a plurality of the detection elements 3 are coupled to the reset control scan line GLrst, the read control scan line GLrd, the cancel control scan line GLcan, and the output signal lines SL. Specifically, the reset control scan line GLrst, the read control scan line GLrd, and the cancel control scan line GLcan extend in the first direction Dx (refer to FIG. 2) and are coupled to the detection elements 3 arranged in the first direction Dx. The output signal lines SL extend in the second direction Dy and are coupled to the detection elements 3 arranged in the second direction Dy.

The first reset transistor Mrst1, the second reset transistor Mrst2, the cancel transistor Mcan, the read transistor Mrd, and the source follower transistor Msf are provided correspondingly to each of the photoelectric conversion elements 30. Each of the transistors included in the detection element 3 is made up of an n-type thin-film transistor (TFT). However, each of the transistors is not limited thereto and may be made up of a p-type TFT.

The reference potential VCOM lower than the reset potential Vrst is applied to the anode of the photoelectric conversion element 30. The cathode of the photoelectric conversion element 30 is coupled to a node N1. The node N1 is coupled to one of the source and the drain of the first reset transistor Mrst1, and to the gate of the source follower transistor Msf. When the photoelectric conversion element 30 is irradiated with light, a signal (electric charge) output from the photoelectric conversion element 30 is stored in a capacitor Cd. The capacitor Cd may be internal capacitance of the photoelectric conversion element 30 or may be separately provided in parallel with the photoelectric conversion element 30.

The gate of the first reset transistor Mrst1 is coupled to the reset control scan line GLrst. The other of the source and the drain of the first reset transistor Mrst1 is supplied with the reset potential Vrst.

The source follower transistor Msf is coupled between a terminal supplied with the power supply potential Vsf and the read transistor Mrd (node N2). The gate of the source follower transistor Msf is coupled to the node N1. The signal (electric charge) generated in the photoelectric conversion element 30 is stored in the capacitor Cd, and supplied as a voltage signal to the gate of the source follower transistor Msf. This operation causes the source follower transistor Msf to output a signal voltage corresponding to the electric charge generated in the photoelectric conversion element 30 to the read transistor Mrd.

The read transistor Mrd is coupled between the source of the source follower transistor Msf (node N2) and the output signal line SL. The gate of the read transistor Mrd is coupled to the read control scan line GLrd. When the read transistor Mrd is turned on in response to the read control signal RD, a signal output from the source follower transistor Msf, that is, a voltage signal corresponding to the signal (electric charge) generated in the photoelectric conversion element 30 is output as the detection signal Vdet to the output signal line SL.

The gate of the second reset transistor Mrst2 is coupled to the reset control scan line GLrst. One of the source and the drain of the second reset transistor Mrst2 is coupled to the output signal line SL.

The other of the source and the drain of the second reset transistor Mrst2 is coupled to one of the source and the drain of the cancel transistor Mcan (node N3). The gate of the cancel transistor Mcan is coupled to the cancel control scan line GLcan. The other of the source and the drain of the cancel transistor Mcan is supplied with the reset potential Vrst.

The capacitive element Cc is coupled between the node N1 and the node N3.

In the example illustrated in FIG. 4, each of the first reset transistor Mrst1 and the read transistor Mrd has what is called a single-gate structure, but is not limited thereto, and may have what is called a double-gate structure including two transistors coupled in series, or may have three or more transistors coupled in series. The circuit of each of the detection elements 3 is not limited to the configuration including the five transistors of the first reset transistor Mrst1, the second reset transistor Mrst2, the cancel transistor Mcan, the source follower transistor Msf, and the read transistor Mrd. The detection element 3 may include six or more transistors.

Figure 5:
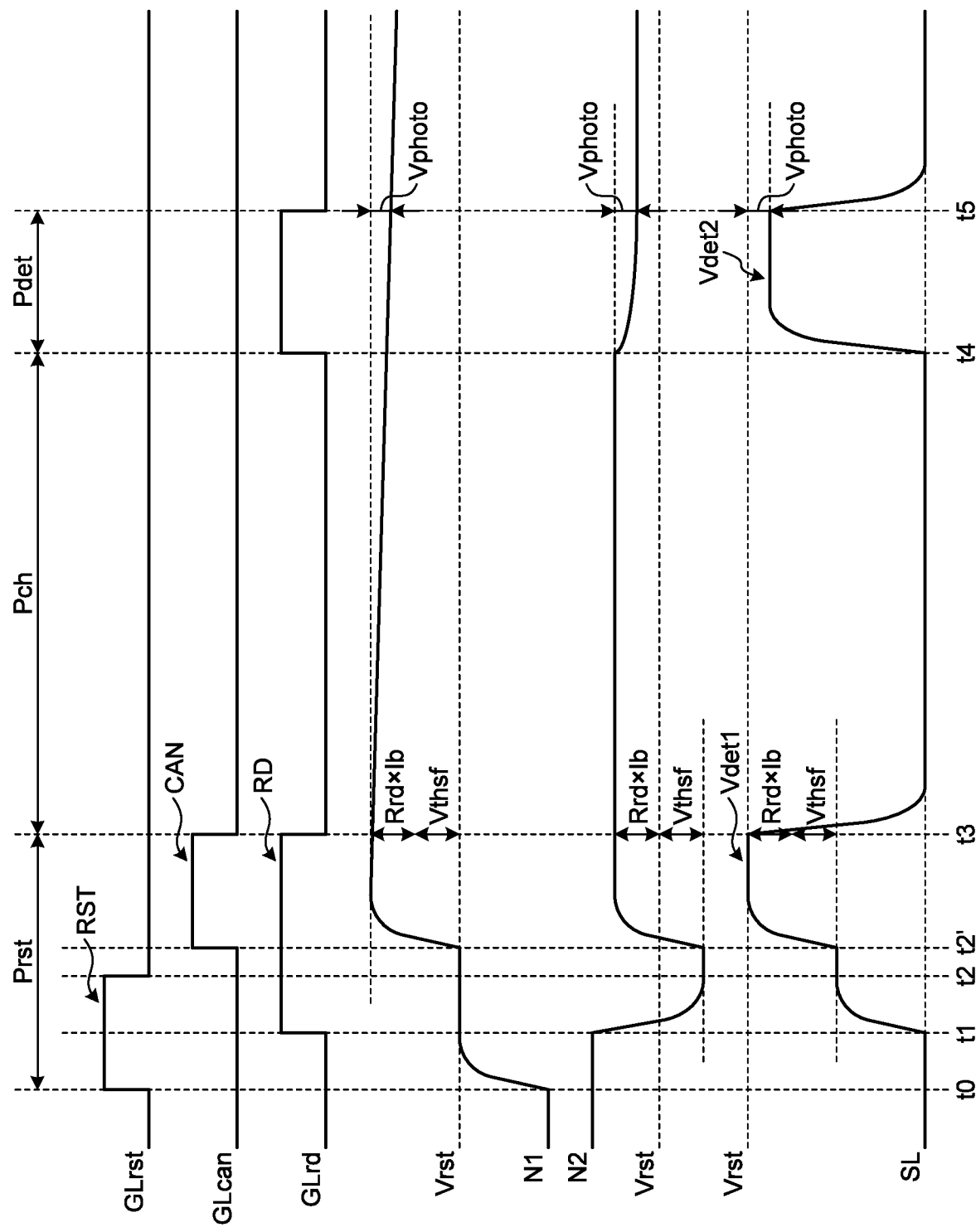
FIG. 5 is a timing waveform diagram illustrating an operation example of the detection element according to the embodiment.
Figure 6A:
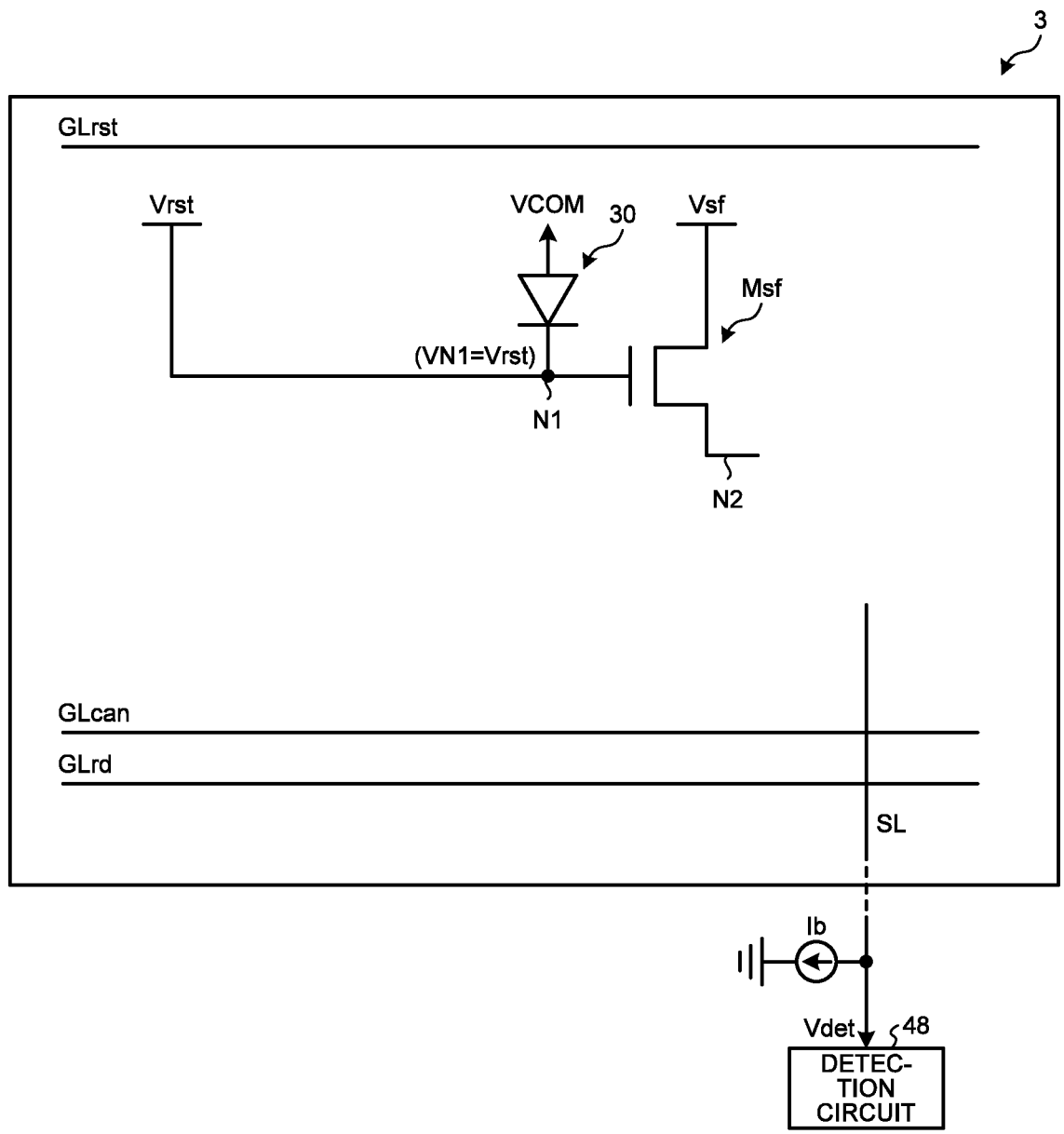
FIG. 6A is a diagram illustrating an equivalent circuit of the detection element during a period from t0 to t1 illustrated in FIG. 5.
Figure 6B:
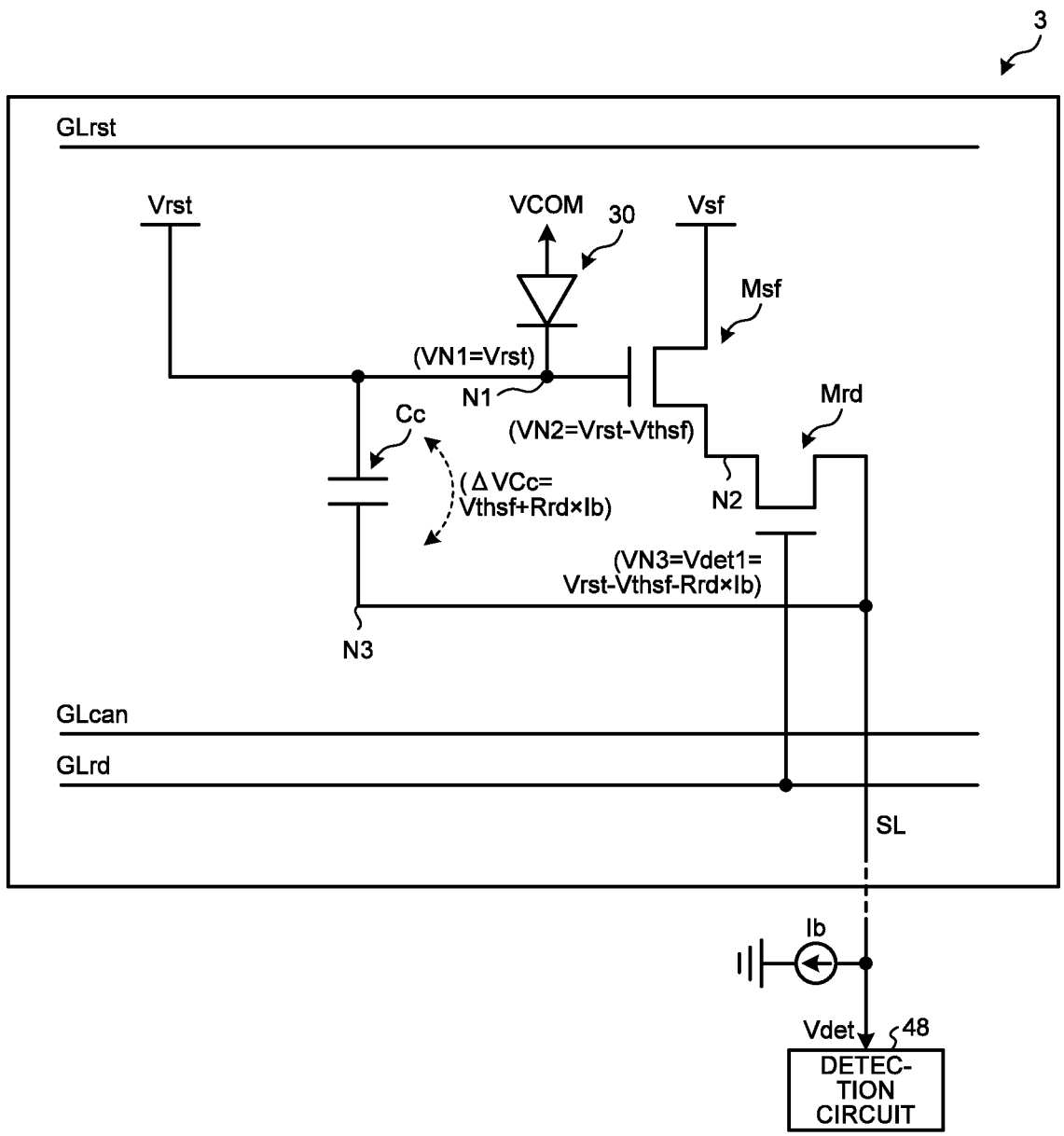
FIG. 6B is a diagram illustrating an equivalent circuit of the detection element during a period from t1 to t2 illustrated in FIG. 5.
Figure 6C:
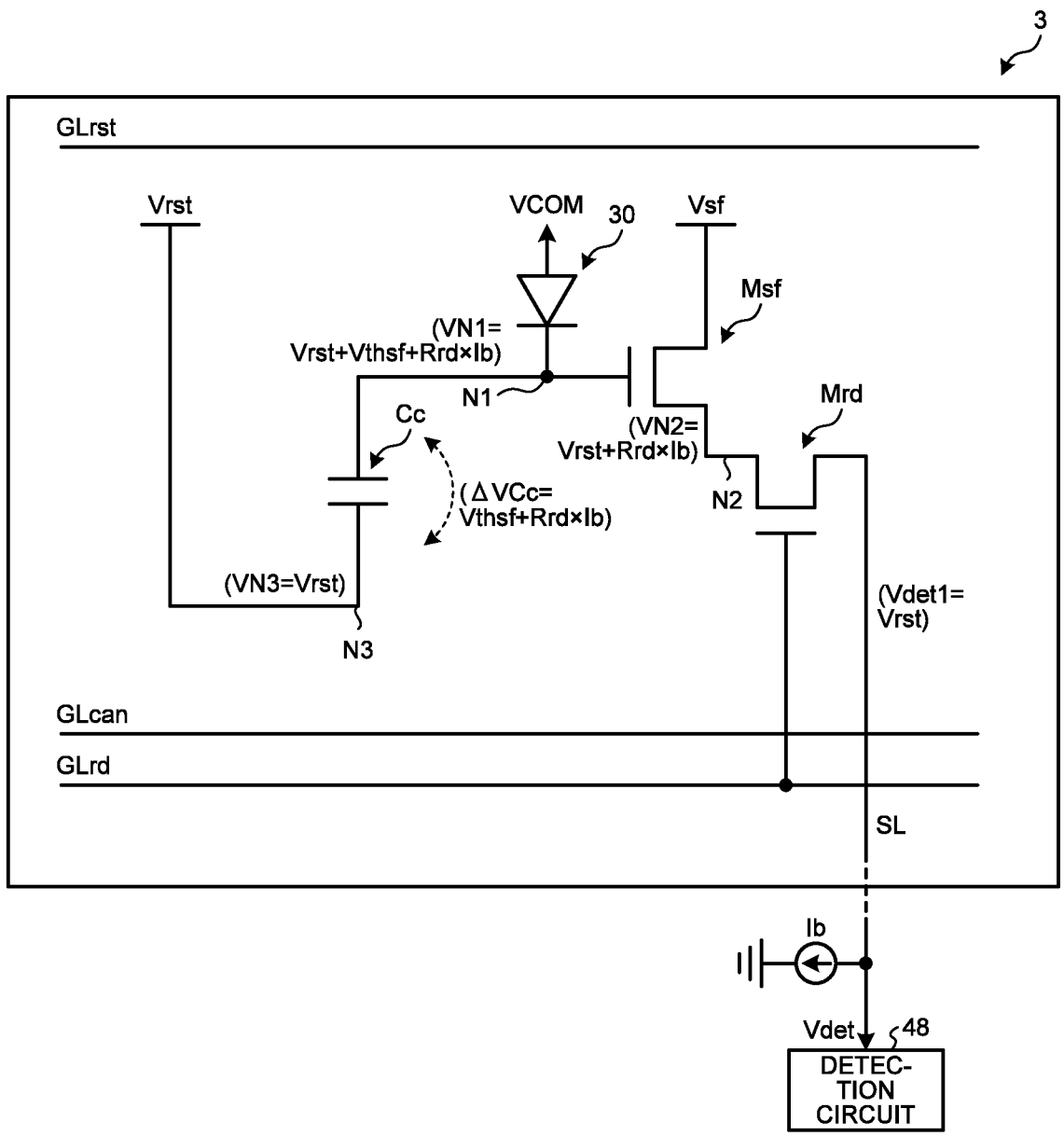
FIG. 6C is a diagram illustrating an equivalent circuit of the detection element during a period from t2' to t3 illustrated in FIG. 5.
Figure 6D:
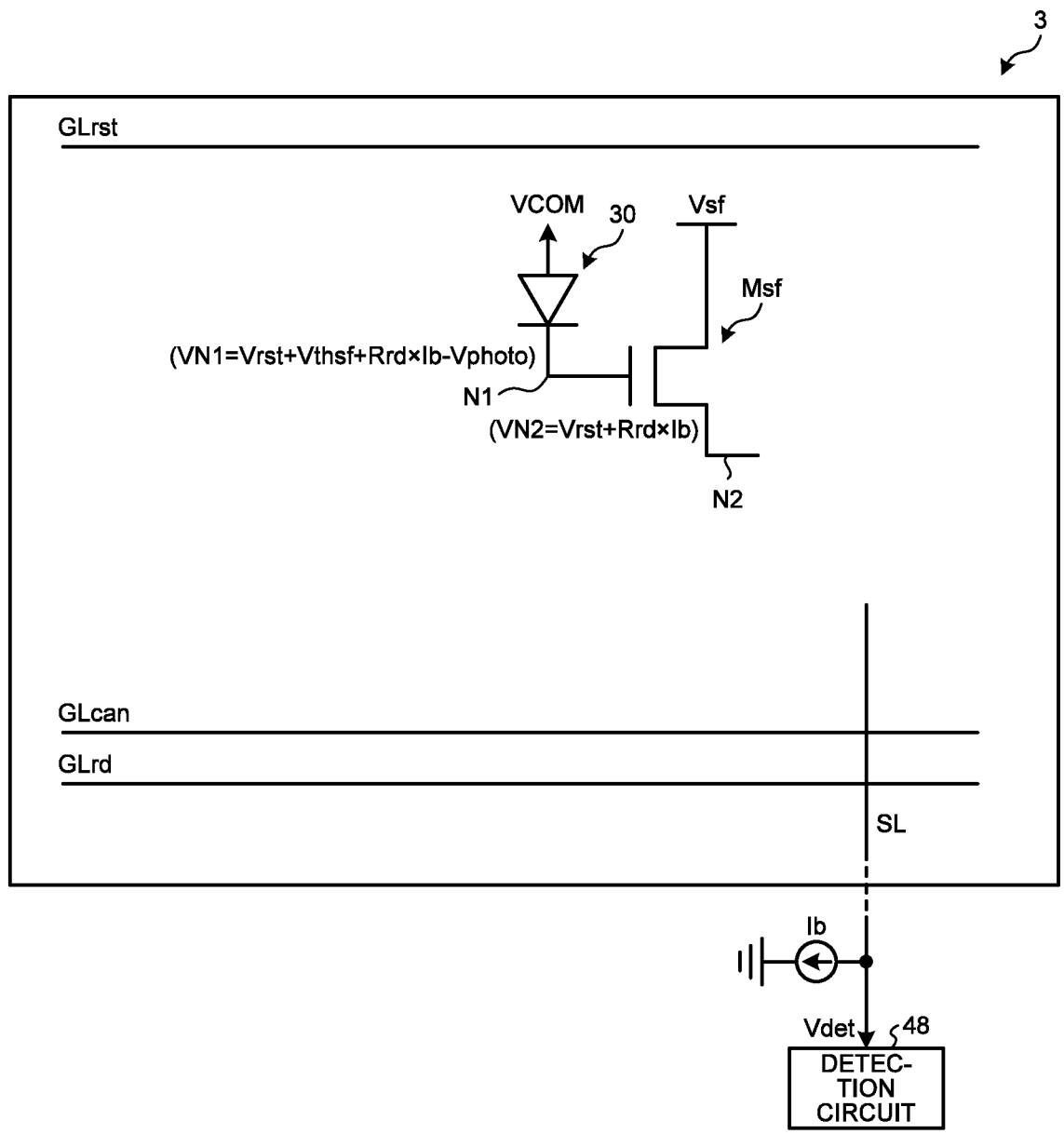
FIG. 6D is a diagram illustrating an equivalent circuit of the detection element during a period from t3 to t4 illustrated in FIG. 5.
Figure 6E:
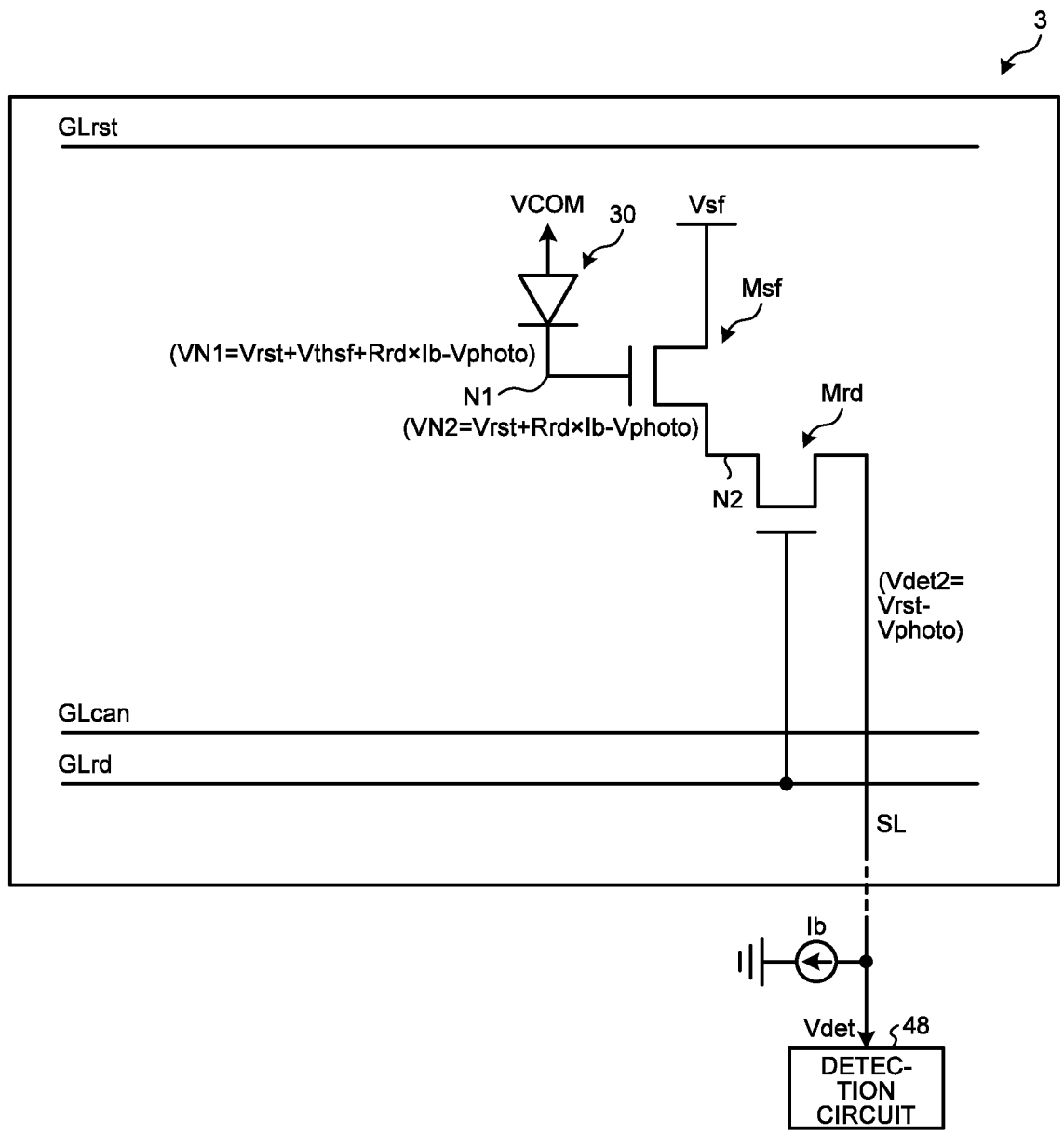
FIG. 6E is a diagram illustrating an equivalent circuit of the detection element during a period from t4 to t5 illustrated in FIG. 5.

FIG. 5 is a timing waveform diagram illustrating an operation example of the detection element according to the embodiment. FIG. 6A is a diagram illustrating an equivalent circuit of the detection element during a period from t0 to t1 illustrated in FIG. 5. FIG. 6B is a diagram illustrating an equivalent circuit of the detection element during a period from t1 to t2 illustrated in FIG. 5. FIG. 6C is a diagram illustrating an equivalent circuit of the detection element during a period from t2' to t3 illustrated in FIG. 5. FIG. 6D is a diagram illustrating an equivalent circuit of the detection element during a period from t3 to t4 illustrated in FIG. 5. FIG. 6E is a diagram illustrating an equivalent circuit of the detection element during a period from t4 to t5 illustrated in FIG. 5.

The detection element 3 performs the detection by performing operations in the order of a reset period Prst, a storage period Pch, and a read period Pdet. The power supply circuit 103 supplies the reference potential VCOM to the anode of the photoelectric conversion element 30 over the reset period Prst, the storage period Pch, and the read period Pdet. In the present embodiment, the reset period Prst is a period to set Vdet1 that serves as a reference value for a voltage variation amount of the detection signal Vdet corresponding to the light applied to the photoelectric conversion element 30.

At time t0, the control circuit 102 sets the reset control signal RST to be supplied to the reset control scan line GLrst to be a HIGH (high-level voltage) to start the reset period Prst. In the reset period Prst, the first reset transistor Mrst1 and the second reset transistor Mrst2 are turned on (into a conduction state). As a result, a potential VN1 of the node N1 becomes the reset potential Vrst as represented in Expression (1) below (refer to FIG. 6A).

$$VN1 = Vrst \quad (1)$$

At time t1, the control circuit 102 sets the read control signal RD, which is supplied to the read control scan line GLrd, to be a HIGH (high-level voltage). This operation turns on the read transistor Mrd (into the conduction state). At this time, a potential VN2 of the node N2 is represented in Expression (2) below (refer to FIG. 6B). In Expression (2) below, Vthsf denotes a threshold voltage of the source follower transistor Msf.

$$VN2 = Vrst - Vthsf \quad (2)$$

At this time, a potential VN3 of the node N3, that is, the potential Vdet1 of the detection signal Vdet output from the output signal line SL is represented in Expression (3) below (refer to FIG. 6B). In Expression (3) below, Rrd denotes the on-resistance of the read transistor Mrd, and Ib denotes the bias current conducted to the read transistor Mrd by the constant current source. That is, (Rrd×Ib) on the right-hand side of Expression (3) below denotes a voltage drop caused by the on-resistance Rrd of the read transistor Mrd.

$$VN3 = Vdet1 = Vrst - Vthsf - Rrd \times Ib \quad (3)$$

At this time, the capacitive element Cc provided between the nodes N1 and N3 is charged by a potential difference ΔVCc (=Vthsf+Rrd×Ib) obtained by subtracting a potential VN3 (=Vrst−Vthsf−Rrd×Ib) of the node N3 from a potential VN1 (=Vrst) of the node N1, as represented in Expression (4) below (refer to FIG. 6B).

$$\Delta VCc = VN1 - VN3$$
$$= Vrst - (Vrst - Vthsf - Rrd \times Ib)$$
$$= Vthsf + Rrd \times Ib \quad (4)$$

The control circuit 102 sets the reset control signal RST to be a LOW (low-level voltage) at time t2 and sets the cancel control signal CAN to be a HIGH (high-level voltage) at time t2'. This operation turns on the cancel transistor Mcan (into the conduction state), and the potential VN3 of the node N3 becomes the reset potential Vrst, as represented in Expression (5) below (refer to FIG. 6C).

$$VN3 = Vrst \quad (5)$$

At this time, the potential VN1 of the node N1 is set, as an initial value, to be a potential obtained by superimposing the potential difference ΔVCc (=Vthsf+Rrd×Ib) between both ends of the capacitive element Cc on the potential VN3 (=Vrst) of the node N3, as represented in Expression (6) below (refer to FIG. 6C). In the present embodiment, if the capacitance of the capacitive element Cc is sufficiently larger than the capacitance of the capacitor Cd of the photoelectric conversion element 30 and parasitic capacitances between the gate and source and between the gate and drain of the source follower transistor Msf, the effect of these capacitances can be ignored.

$$VN1 = VN3 + \Delta VCc$$
$$= Vrst + Vthsf + Rrd \times Ib \quad (6)$$

As a result, the potential VN2 of the node N2 becomes a value (Vrst+Rrd×Ib) obtained by subtracting the threshold voltage Vthsf of the source follower transistor Msf from the potential VN1 (=Vrst+Vthsf+Rrd×Ib) of the node N1, as represented in Expression (7) below, and the potential Vdet1 of the detection signal Vdet output from the output signal line SL is set to be a value obtained by subtracting the voltage drop (=Rrd×Ib) caused by the on-resistance Rrd of the read transistor Mrd from the potential VN2 (=Vrst+Rrd× Ib) of the node N2, that is, set to be the reset potential Vrst, as represented in Expression (8) below.

$$VN2 = VN1 - Vthsf$$
$$= (Vrst + Vthsf + Rrd \times Ib) - Vthsf$$
$$= Vrst + Rrd \times Ib \quad (7)$$

$$Vdet1 = VN2 - Rrd \times Ib$$
$$= (Vrst + Rrd \times Ib) - Rrd \times Ib$$
$$= Vrst \quad (8)$$

At time t3, the control circuit 102 sets the read control signal RD and the cancel control signal CAN to be a LOW (low-level voltage). This operation ends the reset period Prst and starts the storage period Pch. At this time, the read transistor Mrd and the cancel transistor Mcan are turned off (into a non-conduction state), and the potential VN2 of the node N2 becomes constant at (Vrst+Rrd×Ib) represented in Expression (7) above (refer to FIG. 6D). The potential of the detection signal Vdet output from the output signal line SL is set to be a LOW (low-level voltage). The potential VN1 of the node N1 decreases by a voltage variation amount Vphoto corresponding to the light applied to the photoelectric conversion element 30, as represented in Expression (9) below (refer to FIG. 6D).

$$VN1 = Vrst + Vthsf + Rrd \times Ib - Vphoto \quad (9)$$

At time t4, the control circuit 102 sets the read control signal RD to be a HIGH (high-level voltage). As a result, the read transistor Mrd is turned on (into the conduction state) to end the storage period Pch and start the read period Pdet. The potential VN2 of the node N2 decreases by the voltage variation amount Vphoto corresponding to the light applied to the photoelectric conversion element 30, as represented in Expression (10) below (refer to FIG. 6E).

$$VN2 = Vrst + Rrd \times Ib - Vphoto \quad (10)$$

At this time, a potential Vdet2 of the detection signal Vdet output during the read period Pdet becomes a value obtained by subtracting the voltage drop (Rrd×Ib) caused by the on-resistance Rrd of the read transistor Mrd from the potential VN2 (=Vrst+Rrd×Ib−Vphoto) of the node N2, as represented in Expression (11) below. In other words, the potential Vdet2 of the detection signal Vdet decreases from the potential Vdet1 (=Vrst) of the detection signal Vdet at time t3 by the voltage variation amount Vphoto corresponding to the light applied to the photoelectric conversion element 30 (refer to FIG. 6E).

$$Vdet2 = (Vrst + Rrd \times Ib - Vphoto) - Rrd \times Ib$$
$$= Vdet1 - Vphoto$$
$$= Vrst - Vphoto \quad (11)$$

At time t5, the control circuit 102 sets the read control signal RD to be a LOW (low-level voltage). This operation ends the read period Pdet.

The detector 40 detects the potential Vdet2 of the detection signal Vdet at time t5 when the read period Pdet ends. While FIG. 5 illustrates the operation example of one of the detection elements 3, the scan line drive circuit 15 sequentially scans the reset control scan lines GLrst, the read control scan lines GLrd, and the cancel control scan lines GLcan in a time-division manner. Repeating this procedure enables the detection processing using the detection elements 3 in the entire detection region AA.

Figure 7A:
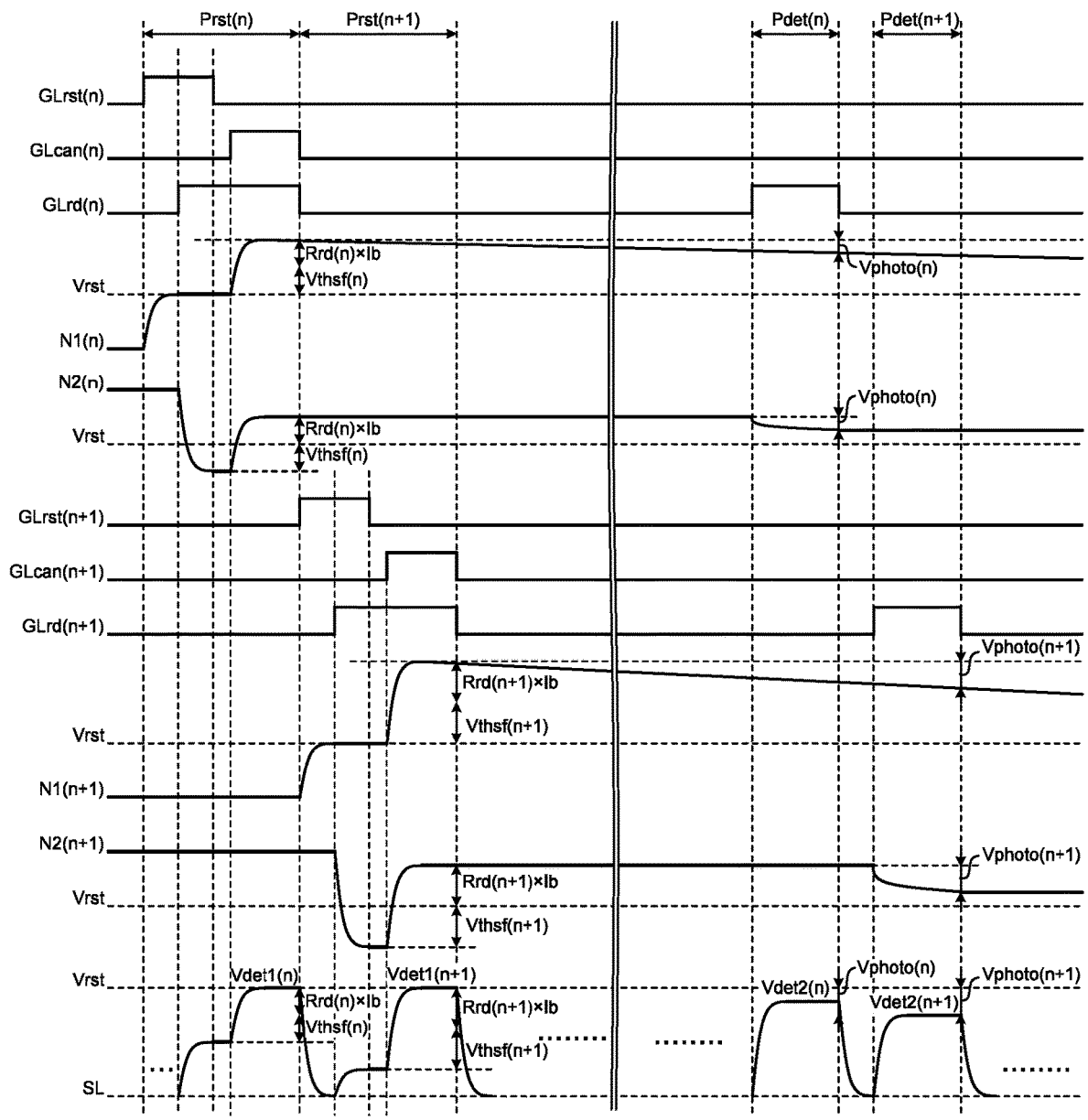
FIG. 7A is a timing waveform diagram illustrating an example of operation of the detection elements in a plurality of rows for one frame.
Figure 7B:
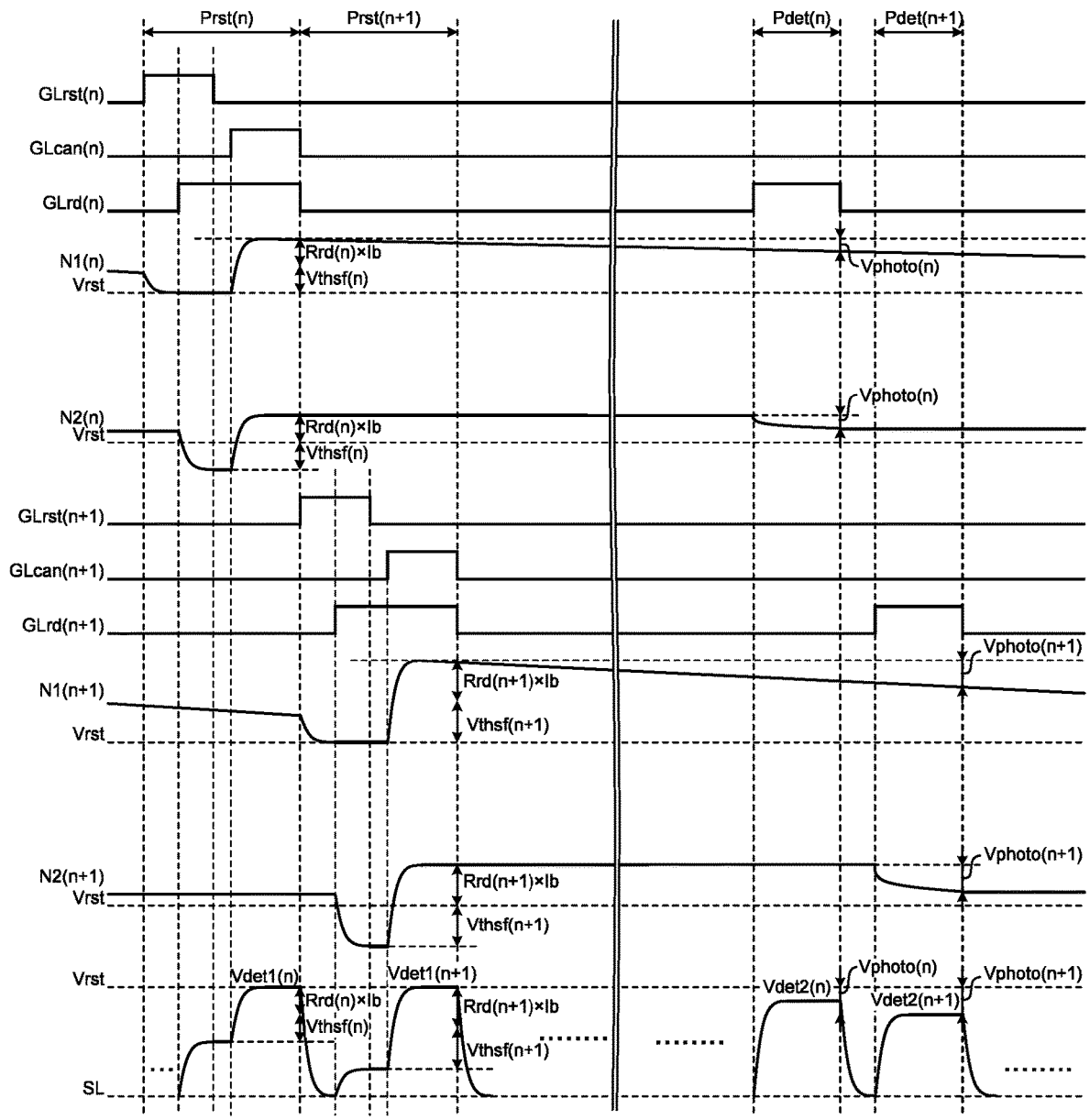
FIG. 7B is a timing waveform diagram illustrating an example of operation for one frame subsequent to the timing waveform diagram illustrated in FIG. 7A.

FIG. 7A is a timing waveform diagram illustrating an example of operation of the detection elements in a plurality of rows for one frame. FIG. 7B is a timing waveform diagram illustrating an example of operation for one frame subsequent to the timing waveform diagram illustrated in FIG. 7A.

In the examples illustrated in FIGS. 7A and 7B, the threshold voltage Vthsf(n) of the source follower transistor Msf in the detection element in the nth row differs from the threshold voltage Vthsf(n+1) of the source follower transistor Msf in the detection element in the (n+1)th row. The on-resistance Rrd(n) of the read transistor Mrd in the detection element in the nth row differs from the on-resistance Rrd(n+1) of the read transistor Mrd in the detection element in the (n+1)th row.

As illustrated in FIGS. 7A and 7B, even when the detection elements are different in the threshold voltage Vthsf of the source follower transistor Msf and the on-resistance Rrd of the read transistor Mrd, the potential Vdet1 of each detection signal Vdet is set to be the reset potential Vrst as represented in Expression (8) above in the reset period Prst. Therefore, as represented in Expression (11) above, the potential Vdet2 of the detection signal Vdet output during the read period Pdet is detected as a value reduced from the reset potential Vrst by the voltage variation amount Vphoto corresponding to the light applied to the photoelectric conversion element 30, without being affected by the threshold voltage Vthsf of the source follower transistor Msf and the on-resistance Rrd of the read transistor Mrd.

Figure 8:
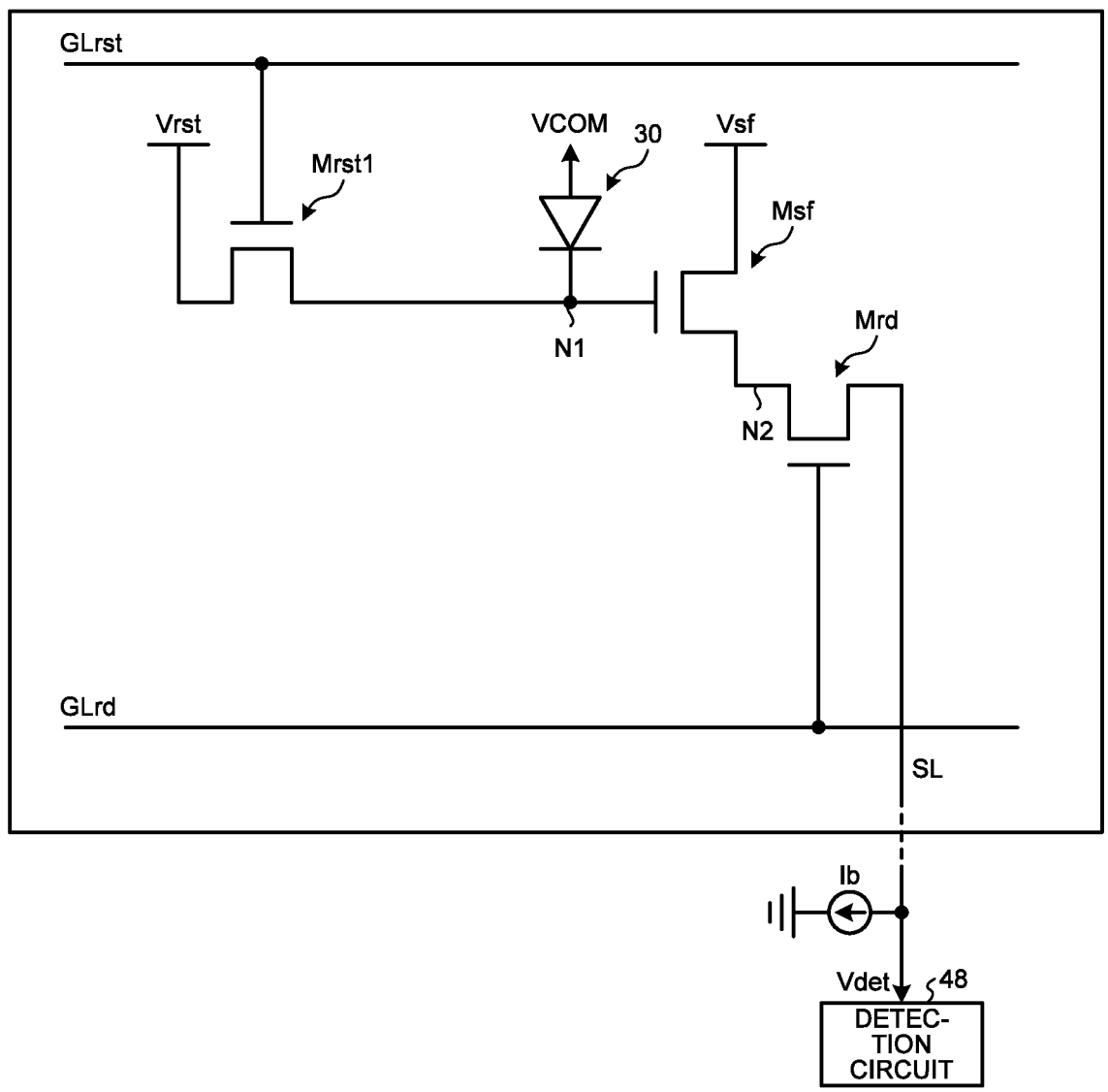
FIG. 8 is a circuit diagram illustrating a detection element according to a comparative example.
Figure 10A:
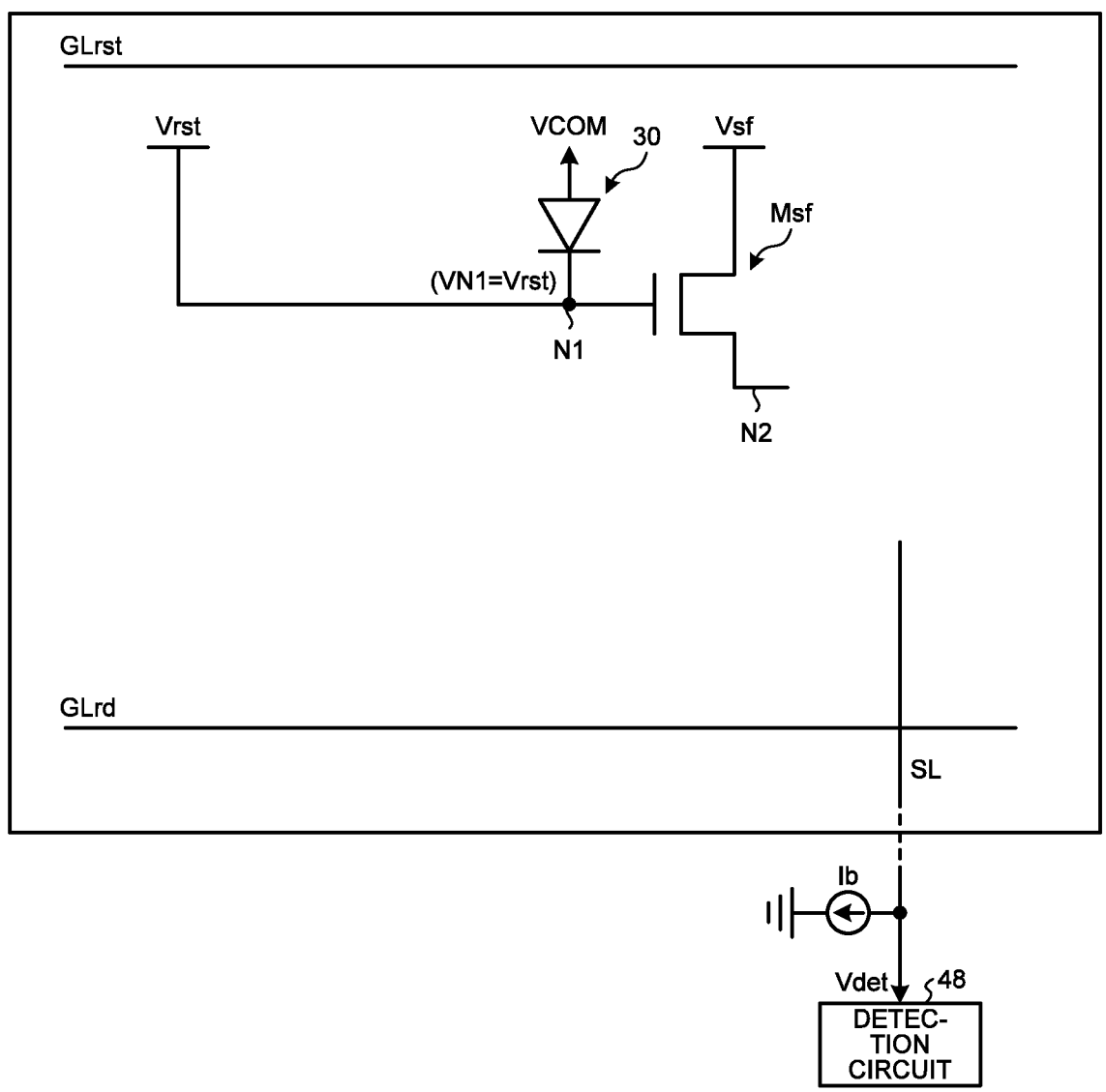
FIG. 10A is a diagram illustrating an equivalent circuit of the detection element during the period from t0 to t1 illustrated in FIG. 9.
Figure 10B:
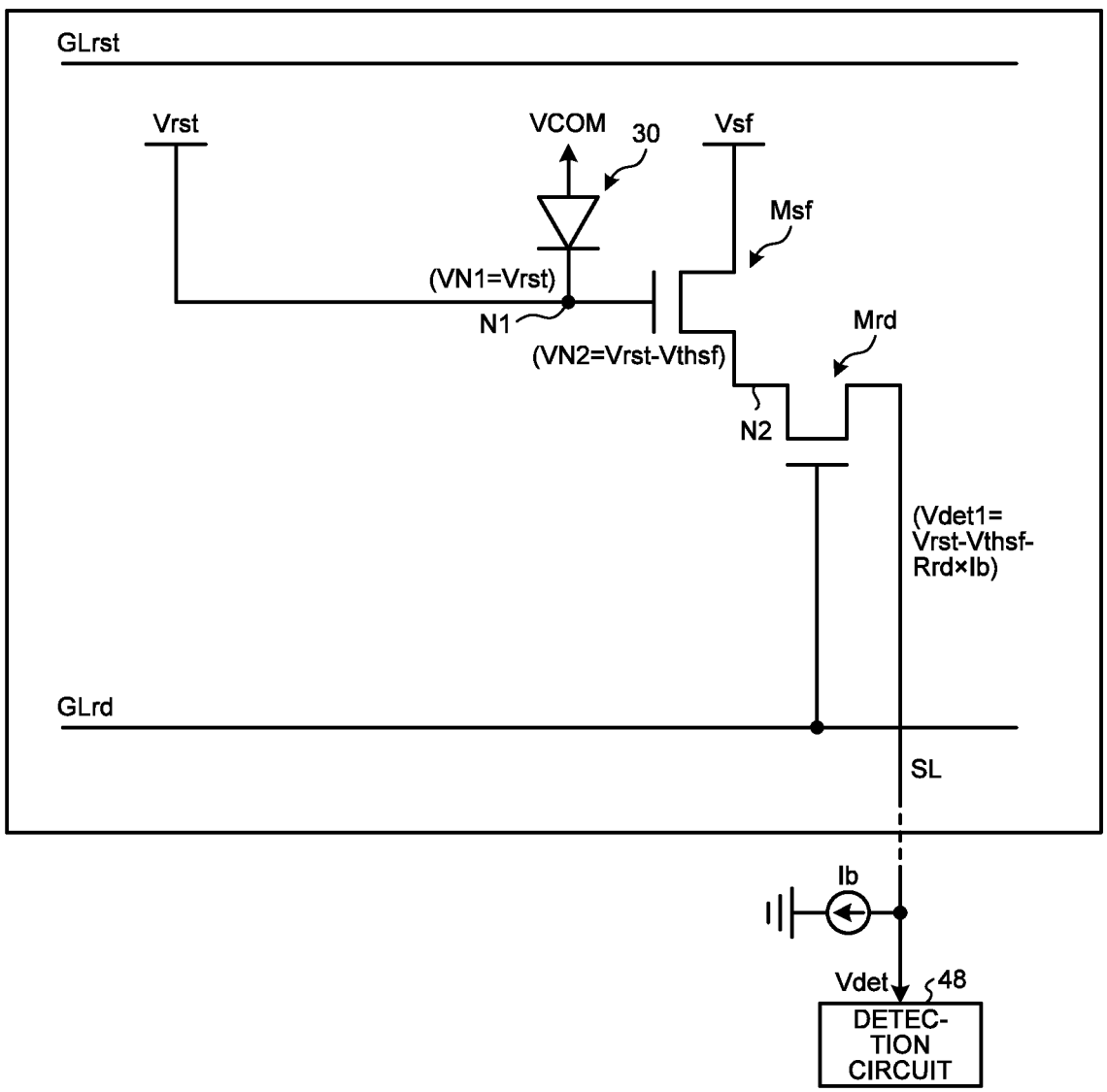
FIG. 10B is a diagram illustrating an equivalent circuit of the detection element during the period from t1 to t2 illustrated in FIG. 9.
Figure 10C:
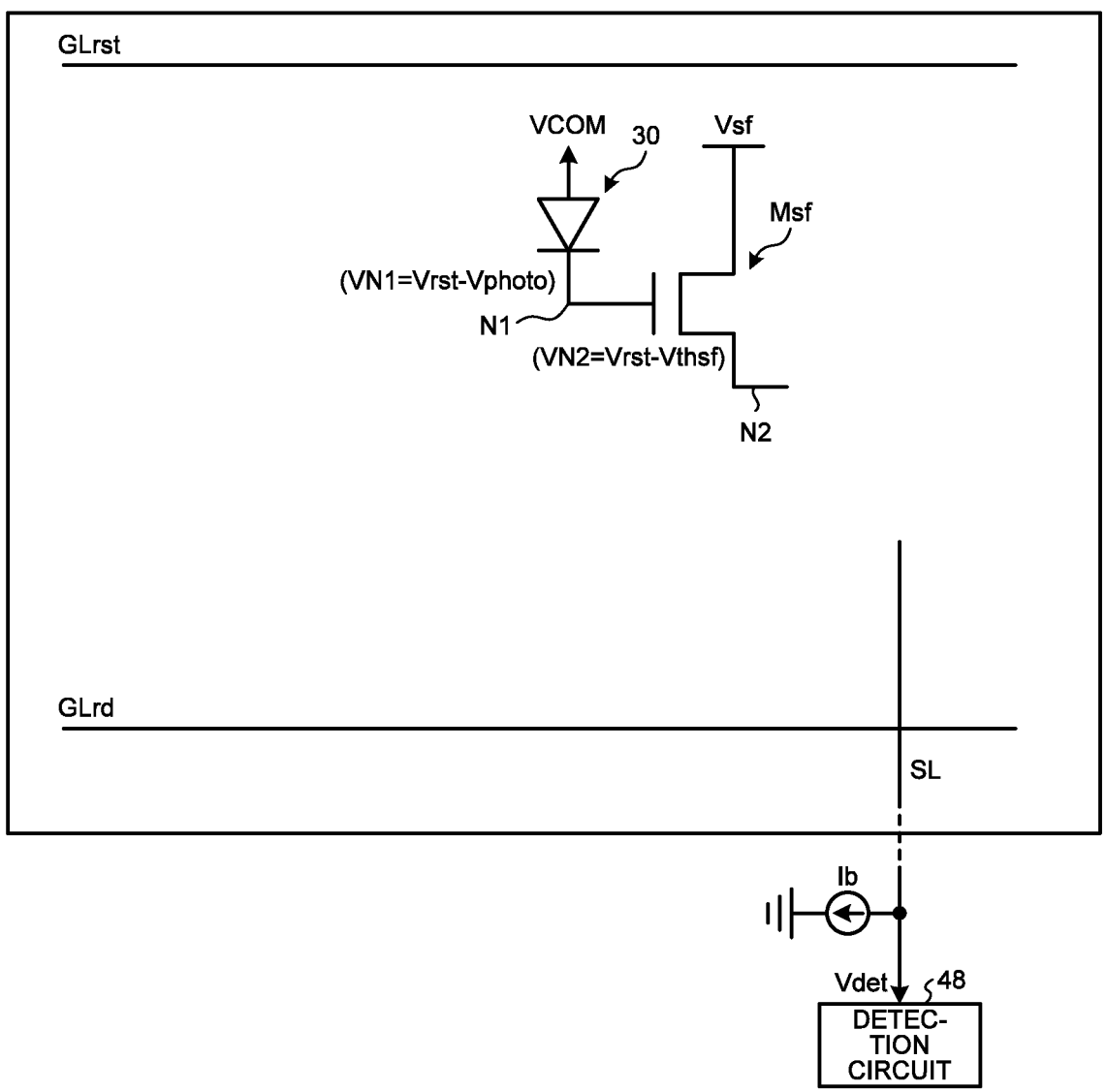
FIG. 10C is a diagram illustrating an equivalent circuit of the detection element during the period from t3 to t4 illustrated in FIG. 9.
Figure 10D:
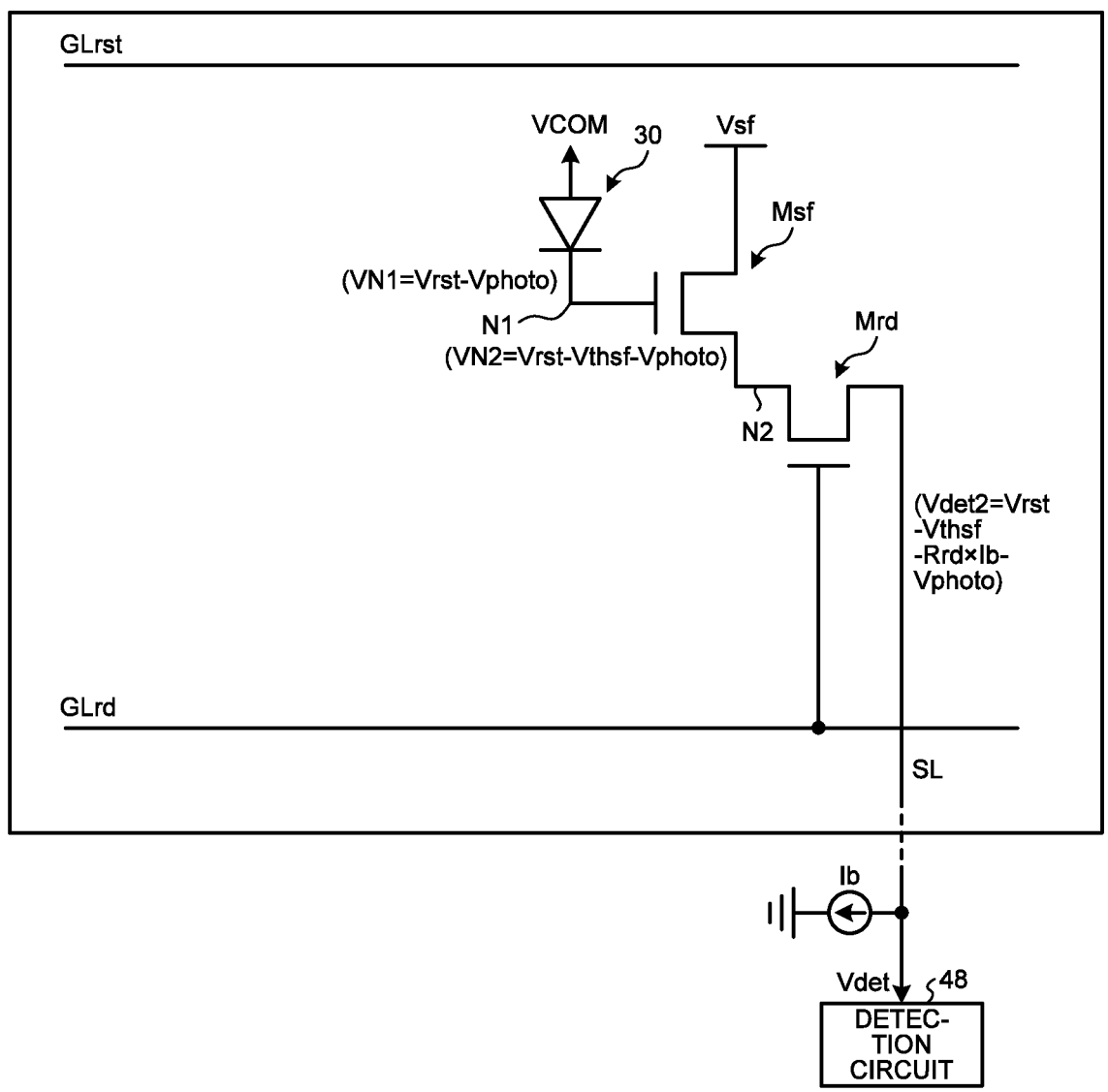
FIG. 10D is a diagram illustrating an equivalent circuit of the detection element during the period from t4 to t5 illustrated in FIG. 9.

The following describes a comparative example for explaining an effect of the detection device 1 according to the present embodiment. FIG. 8 is a circuit diagram illustrating a detection element according to a comparative example. FIG. 9 is a timing waveform diagram illustrating an operation example of the detection element according to the comparative example. FIG. 10A is a diagram illustrating an equivalent circuit of the detection element during the period from t0 to t1 illustrated in FIG. 9. FIG. 10B is a diagram illustrating an equivalent circuit of the detection element during the period from t1 to t2 illustrated in FIG. 9. FIG. 10C is a diagram illustrating an equivalent circuit of the detection element during the period from t3 to t4 illustrated in FIG. 9. FIG. 10D is a diagram illustrating an equivalent circuit of the detection element during the period from t4 to t5 illustrated in FIG. 9.

In the configuration of the comparative example illustrated in FIG. 8, when the reset control signal RST supplied to the reset control scan line GLrst is set to be a HIGH (high-level voltage) at time t0, the reset period Prst starts. In the reset period Prst, the reset transistor Mrst is turned on (into the conduction state). As a result, the potential VN1 of the node N1 becomes the reset potential Vrst as represented in Expression (12) below (refer to FIG. 10A). That is, in the configuration of the comparative example, the reset potential Vrst is set as the initial value of the potential of the node N1 (refer to FIG. 10A).

$$VN1 = Vrst \quad (12)$$

At time t1, the read control signal RD supplied to the read control scan line GLrd is set to be a HIGH (high-level voltage). This operation turns on the read transistor Mrd (into the conduction state). At this time, the potential VN2 of the node N2 is represented in Expression (13) below (refer to FIG. 10B).

$$VN2 = Vrst - Vthsf \quad (13)$$

At this time, the potential Vdet1 of the detection signal Vdet output from the output signal line SL is set to be a value obtained by subtracting the voltage drop (=Rrd×Ib) caused by the on-resistance Rrd of the read transistor Mrd from the potential VN2 (=Vrst−Vthsf) of the node N2, as represented in Expression (14) below (refer to FIG. 10B).

$$Vdet1 = VN2 - Rrd \times Ib$$
$$= Vrst - Vthsf - Rrd \times Ib \quad (14)$$

After the reset control signal RST is set to be a LOW (low-level voltage) at time t2 and the read control signal RD is set to be a LOW (low-level voltage) at time t3, the reset period Prst ends and the storage period Pch starts. At this time, the read transistor Mrd is turned off (into the non-conduction state), and the potential VN2 of the node N2 becomes constant at (Vrst−Vthsf) represented in Expression (13) above (refer to FIG. 10C). The potential of the detection signal Vdet output from the output signal line SL becomes a LOW (low-level voltage). The potential VN1 of node N1 decreases by the voltage variation amount Vphoto corresponding to the light applied to the photoelectric conversion element 30, as represented in Expression (15) below (refer to FIG. 10C).

$$VN1 = Vrst - Vphoto \quad (15)$$

When the read control signal RD is set to be a HIGH (high-level voltage) at time t4, the read transistor Mrd is turned on (into the conduction state) to end the storage period Pch and start the read period Pdet. The potential VN2 of the node N2 decreases by the voltage variation amount Vphoto corresponding to the light applied to the photoelectric conversion element 30, as represented in Expression (16) below (refer to FIG. 10D).

$$VN2 = Vrst - Vthsf - Vphoto \quad (16)$$

At this time, the potential Vdet2 of the detection signal Vdet output during the read period Pdet becomes a value obtained by subtracting the voltage drop (Rrd×Ib) caused by the on-resistance Rrd of the read transistor Mrd from the potential VN2 (=Vrst−Vthsf−Vphoto) of the node N2, as represented in Expression (17) below. In other words, the potential Vdet2 of the detection signal Vdet decreases from the potential Vdet1 (=Vrst−Vthsf−Rrd×Ib) of the detection signal Vdet at time t3 by the voltage variation amount Vphoto corresponding to the light applied to the photoelectric conversion element 30 (refer to FIG. 10D).

$$Vdet2 = (Vrst - Vthsf - Vphoto) - Rrd \times Ib$$
$$= Vdet1 - Vphoto$$
$$= Vrst - Vthsf - Rrd \times Ib - Vphoto \quad (17)$$

When the read control signal RD is set to be a LOW (low-level voltage) at time t5, the read period Pdet ends.

In the detection element of the comparative example, as represented in Expression (14) above, the threshold voltage Vthsf of the source follower transistor Msf and the voltage drop (Rrd×Ib) caused by the on-resistance Rrd of the read transistor Mrd are set in the state of being included in the potential Vdet1 of the detection signal Vdet that serves as the reference value for the voltage variation amount Vphoto of the detection signal Vdet corresponding to the light applied to the photoelectric conversion element 30 and is set during the reset period Prst. As described above, the threshold voltage Vthsf of the source follower transistor Msf and the voltage drop (Rrd×Ib) caused by the on-resistance Rrd of the read transistor Mrd vary from transistor to transistor, and these variations reduce the detection accuracy of the light applied to the photoelectric conversion element 30.

Figure 11:
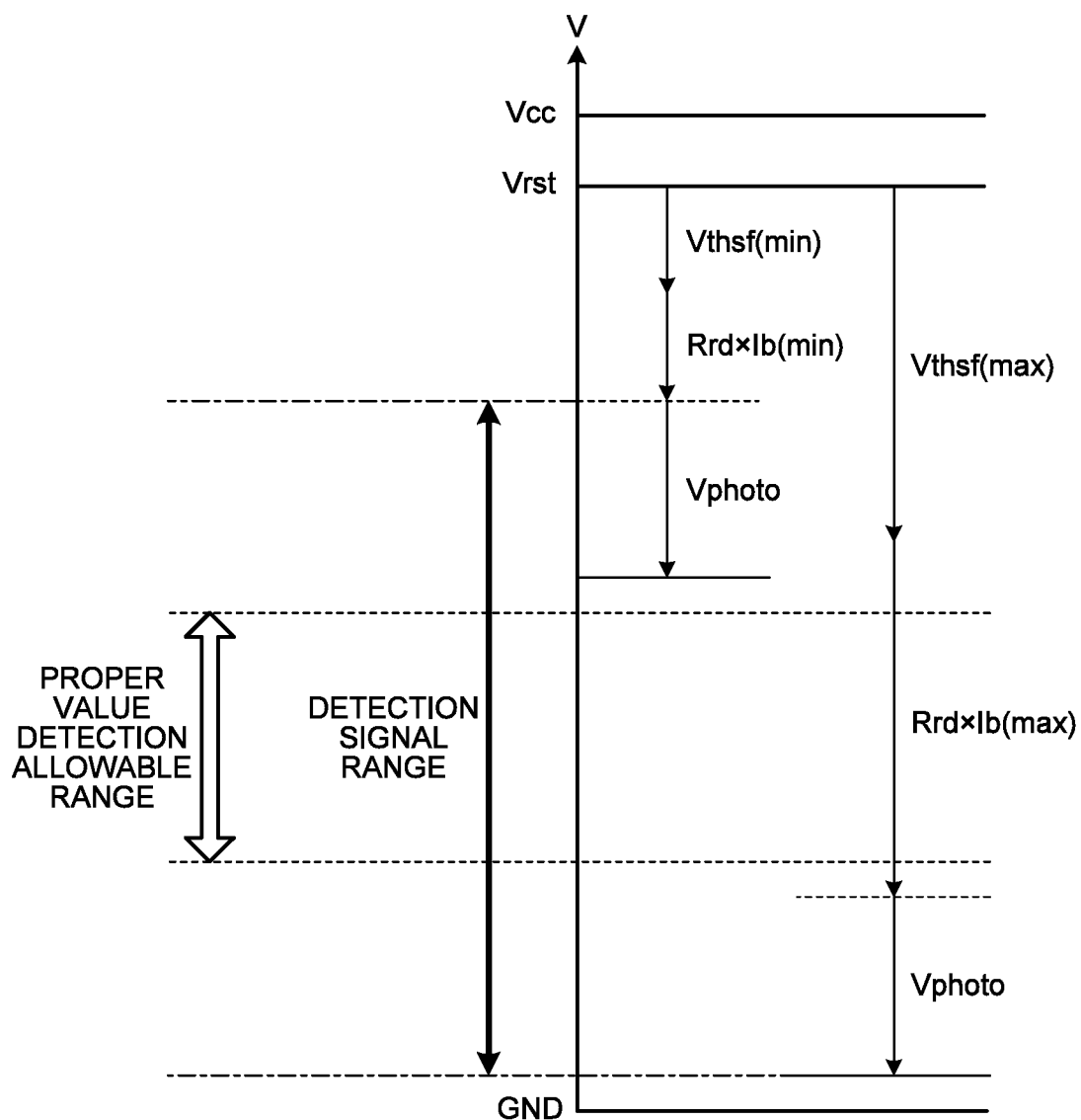
FIG. 11 is a conceptual diagram for explaining a detection signal range of the detection element according to the comparative example illustrated in FIG. 8.
Figure 12:
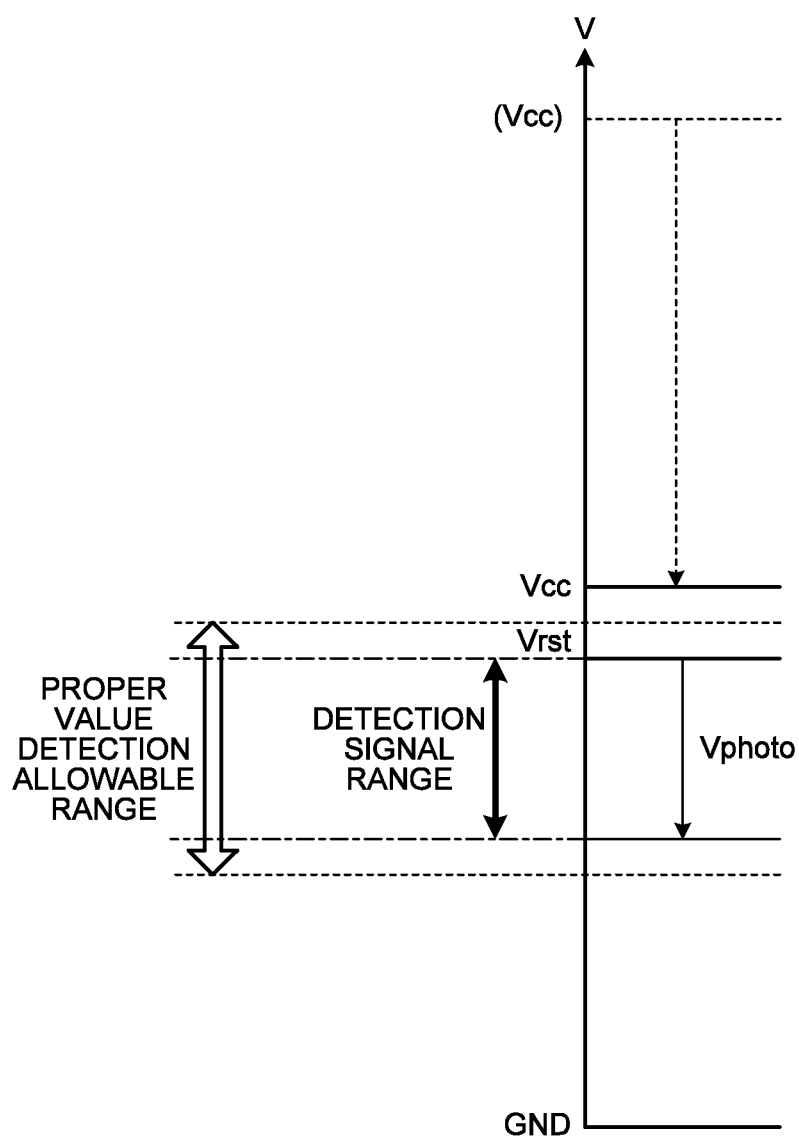
FIG. 12 is a conceptual diagram for explaining the detection signal range of the detection element according to the embodiment.

FIG. 11 is a conceptual diagram for explaining a detection signal range of the detection element according to the comparative example illustrated in FIG. 8. FIG. 12 is a conceptual diagram for explaining the detection signal range of the detection element according to the embodiment. In FIGS. 11 and 12, Vcc denotes a power supply voltage of the detection circuit 48. In FIGS. 11 and 12, the term "proper value detection allowable range" denotes a proper voltage range over which the detection signal Vdet can be detected in the detection circuit 48 at a predetermined degree of accuracy or higher. In FIGS. 11 and 12, the term "detection signal range" denotes a range of values that can be taken by the detection signal Vdet in the detection circuit 48.

As illustrated in FIG. 11, in the detection element of the comparative example illustrated in FIG. 8, the potentials Vdet1 and Vdet2 of the detection signal Vdet include the threshold voltage Vthsf of the source follower transistor Msf and the voltage drop (Rrd×Ib) caused by the on-resistance Rrd of the read transistor Mrd. Therefore, considering a variation range of the threshold voltage Vthsf of the source follower transistor Msf (from Vthsf(min) to Vthsf(max)) and a variation range of the voltage drop (Rrd×Ib) caused by the on-resistance Rrd of the read transistor Mrd (from Rrd×Ib (min) to Rrd×Ib(max)), the detection signal range of values that can be taken by the detection signal Vdet may deviate from the proper voltage range over which the detection signal Vdet can be detected at the predetermined degree of accuracy or higher, and thus, the detection accuracy of the detection signal Vdet may decrease.

In contrast to the detection element of the comparative example, during the reset period Prst illustrated in FIG. 5, the detection element 3 of the present embodiment illustrated in FIG. 4 has the configuration that can set the potential obtained by superimposing the threshold voltage Vthsf of the source follower transistor Msf and the voltage drop (Rrd×Ib) caused by the on-resistance Rrd of the read transistor Mrd on the reset potential Vrst as the initial value of the potential VN1 of the node N1 applied to the photoelectric conversion element 30 as illustrated in FIG. 6B (refer to Expression (6) above). With this configuration, the potential of Vdet1 serving as the reference value for the voltage variation amount Vphoto of the detection signal Vdet corresponding to the light applied to the photoelectric conversion element 30 is set to be the reset potential Vrst (refer to Expression (8) above). As a result, as illustrated in FIG. 6E, the potential Vdet2 of the detection signal Vdet output during the read period Pdet illustrated in FIG. 5 can be detected as a value that is reduced from the reset potential Vrst by the voltage variation amount Vphoto corresponding to the light applied to the photoelectric conversion element 30 and that is obtained by canceling the threshold voltage Vthsf of the source follower transistor Msf and the voltage drop (Rrd×Ib) caused by the on-resistance Rrd of the read transistor Mrd, each of which serves as a factor of the reduction in the detection accuracy of the light applied to the photoelectric conversion element 30 (refer to Expression (11) above).

Therefore, in the detection element 3 of the present embodiment, as illustrated in FIG. 12, appropriate setting of the reset potential Vrst allows the detection signal range of values that can be taken by the detection signal Vdet to fall within the proper value detection allowable range over which the detection signal Vdet can be detected at the predetermined degree of accuracy or higher. Thus, the detection device 1 capable of detecting with higher accuracy than the comparative example can be provided.

Applying the detection element 3 of the present embodiment also allows the reset potential Vrst to be lower than that in the case of applying the detection element according to the comparative example. Therefore, the power supply voltage Vcc of the detection circuit 48 can be made lower than that in the case of applying the detection element according to the comparative example. Applying the detection element 3 of the present embodiment can also contribute to downsizing of integrated circuits (ICs) that implement, for example, the detection circuit 48, and cost reduction of the detection device 1, including, for example, the power supply circuit.

As described above, the detection device 1 according to the embodiment sets the potential (=Vrst+Vthsf+Rrd×Ib) obtained by superimposing the threshold voltage Vthsf of the source follower transistor Msf and the voltage drop (Rrd×Ib) caused by the on-resistance Rrd of the read transistor on the reset potential Vrst serving as the reference value for the voltage variation amount Vphoto of the detection signal Vdet, as the initial value of the potential applied to the photoelectric conversion element 30.

Specifically, the detection element 3 of the present embodiment includes: the capacitive element Cc coupled, at one end thereof, to the coupling point between the photoelectric conversion element 30 and the source follower transistor Msf; the first reset transistor Mrst1 that supplies or interrupts the reset potential Vrst to the one end of the capacitive element Cc; the second reset transistor Mrst2 that electrically couples or decouples the other end of the capacitive element Cc to or from the output of the read transistor Mrd; and the cancel transistor Mcan that supplies or interrupts the reset potential Vrst to the other end of the capacitive element Cc.

In the configuration described above, during the reset period Prst, the first reset transistor Mrst1 and the second reset transistor Mrst2 are controlled to be on, the read transistor Mrd is subsequently controlled to be on to charge the capacitive element Cc by the potential difference (=Vthsf+Rrd×Ib) between the reset potential Vrst and the output potential (=Vrst−Vthsf−Rrd×Ib) of the read transistor Mrd, and further the first reset transistor Mrst1 and the second reset transistor Mrst2 are controlled to be off and the cancel transistor Mcan is controlled to be on to set the potential (=Vrst+Vthsf+Rrd×Ib) obtained by superimposing the potential difference (=Vthsf+Rrd×Ib) between both ends of the capacitive element Cc on the reset potential Vrst, as the initial value of the potential applied to the photoelectric conversion element 30.

This operation can cancel the threshold voltage Vthsf of the source follower transistor Msf and the voltage drop (Rrd×Ib) caused by the on-resistance Rrd of the read transistor Mrd, both of which serves as a factor of the reduction in the detection accuracy of the light applied to the photoelectric conversion element 30, and whereby the reference value for the voltage variation amount Vphoto of the detection signal Vdet corresponding to the light applied to the photoelectric conversion element 30 is set to be the reset potential Vrst.

Then, the read transistor Mrd is controlled to be off, and the cancel transistor Mcan is controlled to be off. After the storage period Pch following the reset period Prst elapses, the read transistor Mrd is controlled to be on to start the read period Pdet.

As a result, during the storage period Pch, the potential of the photoelectric conversion element 30 decreases by the voltage variation amount Vphoto corresponding to the light applied to the photoelectric conversion element 30 to reach the potential (=Vrst+Vthsf+Rrd×Ib−Vphoto). At this time, the potential Vdet2 of the detection signal Vdet detected in the storage period Pch reaches the potential (=Vrst−Vphoto) that is reduced from the reset potential Vrst serving as the potential Vdet1 of the detection signal Vdet in the reset period Prst by the voltage variation amount Vphoto corresponding to the light applied to the photoelectric conversion element 30.

According to the present embodiment, the detection device 1 capable of reducing the variations in the detection value can be obtained.

The components in the embodiment described above can be combined with each other as appropriate. Other operational advantages accruing from the aspects described in the embodiment herein that are obvious from the description herein or that are appropriately conceivable by those skilled in the art will naturally be understood as accruing from the present disclosure.

What is claimed is:

1. A detection device comprising:
    a sensor in which a plurality of detection elements each comprising a photoelectric conversion element are arranged in a detection region;
    a drive circuit configured to supply a plurality of drive signals to the detection elements; and
    a detection circuit configured to process a detection signal output from each of the detection elements,
    wherein each of the detection elements comprises:
        a source follower transistor configured to output a signal corresponding to an electric charge generated in the photoelectric conversion element; and
        a read transistor configured to read an output signal of the source follower transistor and output the detection signal, and
    wherein a potential obtained by superimposing a threshold voltage of the source follower transistor and a voltage drop caused by on-resistance of the read transistor on a reset potential serving as a reference value for a voltage variation amount of the detection signal is set as an initial value of a potential applied to the photoelectric conversion element.

2. The detection device according to claim 1, further comprising a capacitive element configured to be charged by a potential difference between an input of the source follower transistor and an output of the read transistor,
    wherein a potential obtained by superimposing a potential difference between both ends of the capacitive element on the reset potential is set as the initial value during a reset period.

3. The detection device according to claim 2,
    wherein, during the reset period, the potential obtained by superimposing the potential difference between both ends of the capacitive element on the reset potential is applied to a coupling point between the photoelectric conversion element and the input of the source follower transistor after the capacitive element is charged by the potential difference between the input of the source follower transistor and the output of the read transistor.

4. The detection device according to claim 2,
    wherein one end of the capacitive element is coupled to a coupling point between the photoelectric conversion element and the source follower transistor, and
    wherein the detection device further comprises:
        a first reset transistor configured to supply or interrupt the reset potential to the one end of the capacitive element;
        a second reset transistor configured to electrically couple or decouple another end of the capacitive element to or from the output of the read transistor; and
        a cancel transistor configured to supply or interrupt the reset potential to the other end of the capacitive element.

5. The detection device according to claim 4,
    wherein the drive signals include:
        a read control signal to control the read transistor;
        a reset control signal to control the first reset transistor and the second reset transistor; and
        a cancel control signal to control the cancel transistor, and
    wherein the detection device further comprises:
        a read control scan line configured to supply the read control signal to the read transistor;
        a reset control scan line configured to supply the reset control signal to the first reset transistor and the second reset transistor; and
        a cancel control scan line configured to supply the cancel control signal to the cancel transistor.

6. The detection device according to claim 4,
    wherein the drive circuit is configured to, in sequence during the reset period:
        control the first reset transistor and the second reset transistor to be on;
        control the read transistor to be on;
        control the first reset transistor and the second reset transistor to be off and the cancel transistor to be on; and
        control the read transistor to be off and the cancel transistor to be off, and
    wherein the drive circuit is configured to control the read transistor to be on to start a read period after a storage period following the reset period elapses.

* * * * *